United States Patent [19]
Fields et al.

[11] Patent Number: 5,007,077
[45] Date of Patent: Apr. 9, 1991

[54] COIN TELEPHONE MESSAGE AND MANAGEMENT SYSTEM

[75] Inventors: Gary C. Fields; Mark E. Stamos, both of Oakland; Lawrence T. Pena, San Carlos, all of Calif.

[73] Assignee: Conway Engineering, Inc., Oakland, Calif.

[21] Appl. No.: 498,263

[22] Filed: Mar. 23, 1990

[51] Int. Cl.⁵ .................. H04M 11/08; H04M 3/42; H04M 17/00
[52] U.S. Cl. .................................. 379/67; 379/143; 379/146; 379/88
[58] Field of Search .................. 379/143, 146, 84, 85, 379/67, 88, 76, 97

[56] References Cited

U.S. PATENT DOCUMENTS

| | | |
|---|---|---|
| Re. 30,973 | 6/1982 | Zarouni . |
| 4,031,324 | 6/1977 | Dudonis . |
| 4,124,774 | 11/1978 | Zarouni . |
| 4,221,933 | 9/1980 | Cornell et al. . |
| 4,510,349 | 4/1985 | Segre-Amar . |
| 4,698,840 | 10/1987 | Dively et al. . |
| 4,766,604 | 8/1988 | Axberg ................................ 379/67 |
| 4,777,647 | 10/1988 | Smith et al. ........................ 379/151 |
| 4,811,382 | 3/1989 | Sleevi . |
| 4,825,460 | 4/1989 | Carter et al. ........................ 379/67 |
| 4,839,916 | 6/1989 | Fields et al. ........................ 379/13 |
| 4,850,007 | 7/1989 | Marino et al. ...................... 379/67 |
| 4,901,341 | 2/1990 | Carter et al. ........................ 379/67 |

OTHER PUBLICATIONS

Feature Specific Document No. 10-01-000, Bell Communications Research, Dec. 1984.
Feature Specific Document No. 80-01-022, Bell Communications Research, Dec. 1985, revised Dec. 1986.
Service & Installation Manual, Model 1200-4, Elcotel Inc., 1988.
Series 5, Line-Powered Payphone with Smart Payphone Software, Elcotel Inc., Jan. 1990.

*Primary Examiner*—Stafford D. Schreyer
*Attorney, Agent, or Firm*—David B. Harrison

[57] ABSTRACT

A coin telephone message and management system is provided for use at a central office location of a telephone system with a plurality of conventional remotely located coin telephone stations and with, or in place of, an automated coin subsystem to which the coin telephone stations are otherwise connected by coin trunks. The coin telephone message and management system comprises a plurality of programmable line interface units each being connected to a said coin trunk for monitoring electrical signals present on the coin trunk indicative of usage of the station connected thereto, for delivering predetermined messages to a user of the station, and for generating electrical signals emulative of operation of the station for thereby controlling the automated coin subsystem; a message storage and delivery unit selectively connectable to the programmable line interface units for delivering at least one selectable audio message to the user of a said station via the coin trunk; and, a programmed system controller for coordinating operations of the programmable line interface units and the message storage and delivery unit for delivery of selected messages to the user of a said station, for responding to data entered by the user of a said station and for causing electrical signals emulative of operation of the station to be generated by the line interface unit.

18 Claims, 22 Drawing Sheets

FIG. 3a

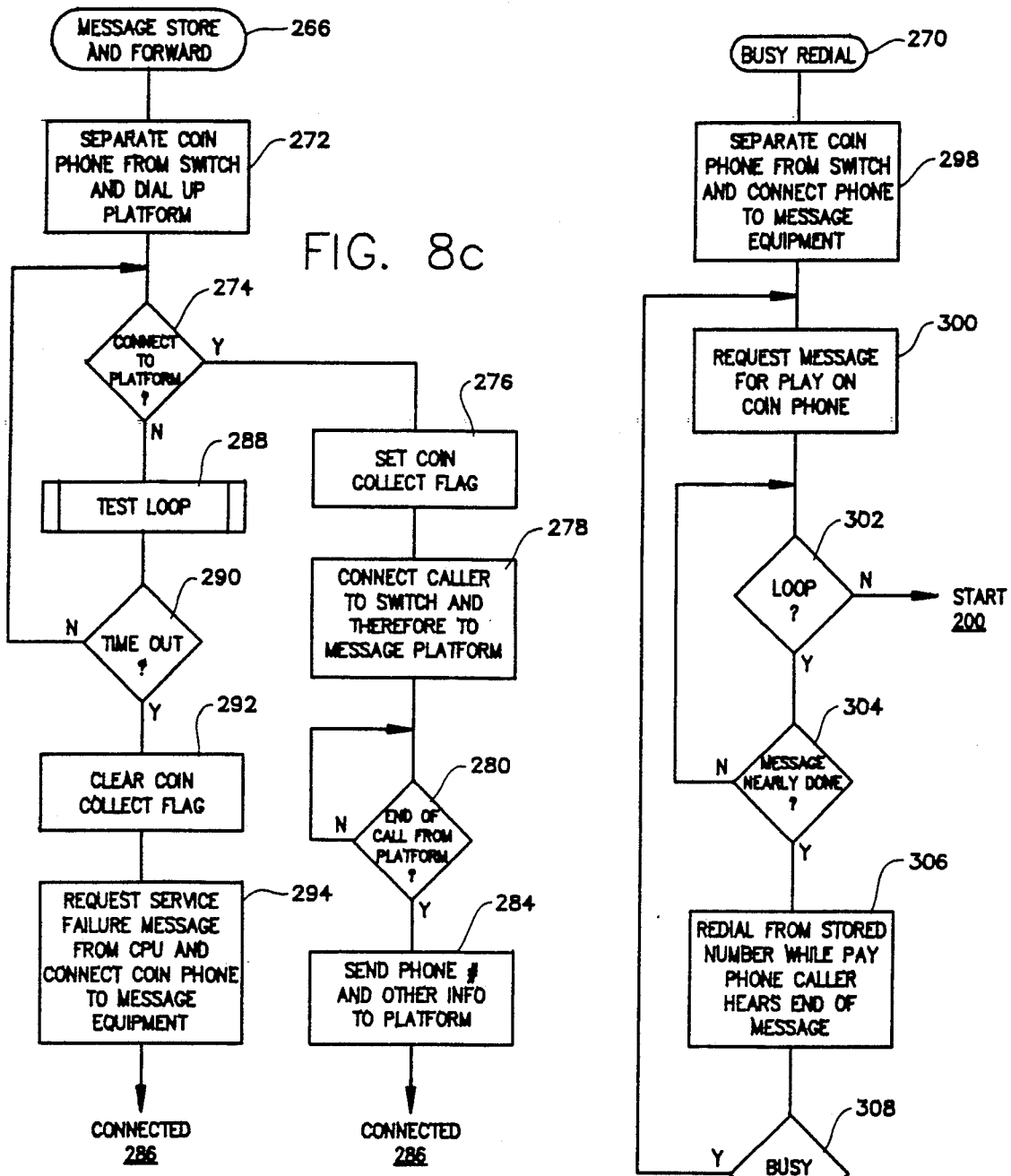
FIG. 8c
FIG. 8e
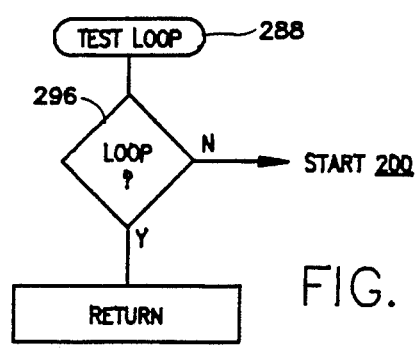
FIG. 8d

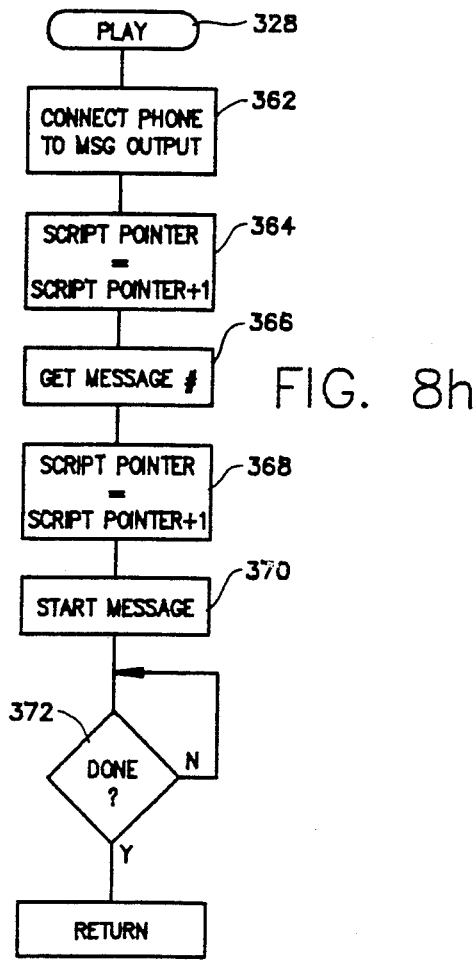
FIG. 8h
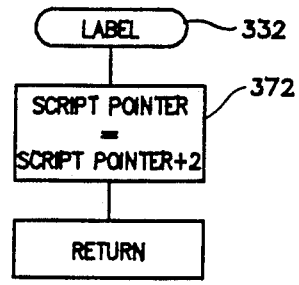
FIG. 8i
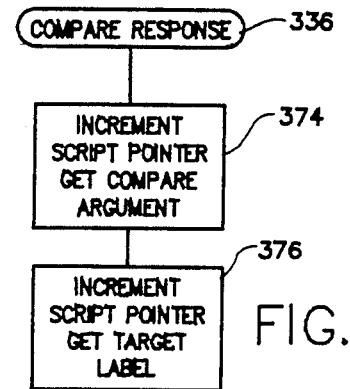
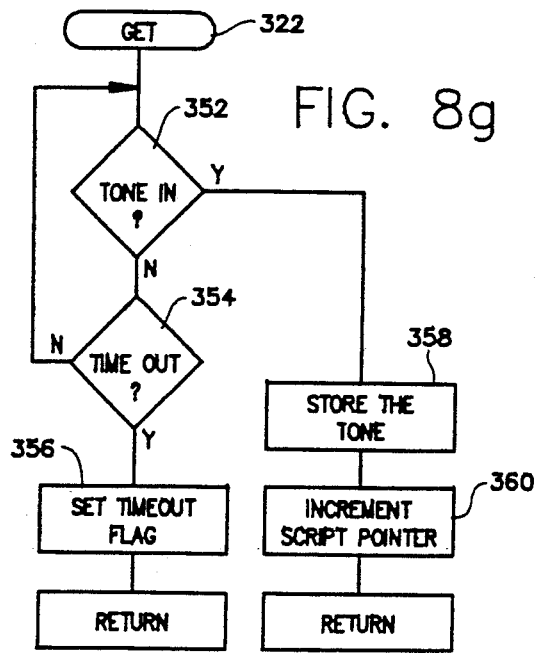
FIG. 8g
FIG. 8j

COIN TELEPHONE MESSAGE AND MANAGEMENT SYSTEM

FIELD OF THE INVENTION

The present invention relates to message delivery methods and apparatus for programmably expanding the number and quality of features for conventional coin operated telephones within a commercial dial telephone communications network.

BACKGROUND OF THE INVENTION

Coin telephone stations typically include all of the features of a conventional single line telephone instrument, such as a handset containing transmitting and receiving elements, a cradle for the handset to signal when the handset is "on-hook" and when it is taken "off-hook", and a dialing mechanism, such as a rotary pulse dial, or a dual tone multifrequency dial pad for generating dialing signals. In addition, the coin telephone station includes a coin handling mechanism for receiving coins into an escrow chamber, for identifying each coin by denomination and for generating signals indicative of the deposit of each particular coin denomination handled by the station, for collecting the coins in the escrow chamber when a call is successfully established and/or completed, and for returning coins to the user when the call is not successfully established for one of a number of reasons, such as called party busy, called party unavailable, or telephone system equipment busy, etc.

Conventionally, the coin handling mechanism generated chimes or other signals to annunciate over the telephone tip and ring wire pair to an operator the deposit of particular coins into the escrow chamber. These audible chimes or signals were listened to by the operator to be sure that the user paid for the call before the operator placed it and connected the called party to the coin telephone station.

More recently, the telephone companies have automated coin telephone service so as to eliminate the need for the operator. One example of a fully automated coin telephone handling system is disclosed in the Dudonis U.S. Pat. No. 4,031,324. The approach disclosed in that patent provided for a central office unit which provided automatic generation and delivery via digital stores of messages to the coin telephone user for prompting deposit a required amount of coins to make the particular call. When coins representing the required amount of coins were deposited, an automatically generated message acknowledged the correct deposit. Audible inter-coin prompts were also automatically generated and put out to the coin station to prompt the user to continue depositing coins until the required amount was received. If the user over deposited, an automatic message, providing for calling credit, was then generated and put out to the user. The methods disclosed in the Dudonis patent enabled coin tone detectors to operate simultaneously with the announcement generators without interference.

Further improvements in conventional coin telephone stations have been inclusion at the stations of coin counting mechanisms which enable periodic polling by central office equipment to determine exact coin counts in the collected coin vault of the telephone, thereby eliminating any source of temptation to workers charged with removing the coins from the vault. One example of this improvement is found in Zarouni U.S. Pat. No. 4,124,774 (now U.S. Reissue Pat. No. 30,973).

Dively et al. U.S. Pat. No. 4,698,840 describes a coin operated telephone including an internal computer for managing the operations thereof. The computer analyzes a called party number entered by the user and computes the minimum charge for a minimum time period for the call. A display is then presented to the user as to the amount to be deposited. As coins are deposited, the amount is decremented, and the internal computer connects the station to a telephone line once the requisite amount has been received. The Carter et al. U.S. Pat. No. 4,825,460 added a local message generation capability and an automatic call completion monitoring circuit to the more manual concept disclosed by Dively et al. and offered an opportunity to the user to deliver a message to a message delivery platform in the event that the called party was unavailable. The Cornell et al. U.S. Pat. No. 4,221,933 describes a message delivery platform to which central office ESS equipment is connected via trunk circuits for message collection, storage and delivery.

The Segre-Amar U.S. Pat. No. 4,510,349 describes apparatus for delivery of messages, including commercials, to a calling party during a ringing interval. The Sleevi U.S. Pat. No. 4,811,382, adds the concept of delivering a message which has been selected on the basis of the number entered by the user of the telephone.

While each of the foregoing examples of the prior art has addressed one or a few of the issues relating to coin telephone service, other issues remain. For example, in countries and locations experiencing rapid currency fluctuations and particularly inflationary trends, the existing coin telephone stations are adapted to collect too few coins to accommodate the increasing numbers of coins needed to cover the cost of even local calls. An improved coin telephone service should be adapted to make continued use of the many thousands of conventional coin telephone stations already in place. Also, coin telephone systems having increased interaction with the user are needed. For instance, many locations, such as public airports, include numerous coin telephone stations. Also routinely present at public airports are special telephone stations providing automatic dial-up connections to a variety of services and business of interest to the traveller, such as car rentals, taxi cab, bus and hotels/motels. A need has arisen to add the features and functions of special purpose telephones to the functionality of standard coin telephone stations, thereby eliminating the need for the special telephone stations.

The present inventors have previously described a telephone toll integrity checking system in U.S. Pat. No. 4,839,916 which includes some of the system elements described below which are arranged and programmed differently in order to accomplish a quite different task within a different application. The reader is referred to the referenced patent for further particulars of that system.

A heretofore unsolved need has remained for a coin telephone service which is fully programmable and which makes full use of the capabilities and possibilities of the coin telephone station as an interactive, information and data entry and delivery terminal device, as well as a basic communications station.

SUMMARY OF THE INVENTION WITH OBJECTS

A general object of the present invention is to provide a coin telephone message and management system which overcomes the limitations and drawbacks of the prior art.

A more specific object of the present invention is to provide a real-time reprogrammable, user interactive coin telephone message and management system which expands the functionality of existing coin telephone stations without any need to change or modify the stations themselves.

Yet another specific object of the present invention is to provide a mechanism for effectively delivering commercial messages to coin telephone station users and for providing such users coin-credits for conventional coin telephone service following successful delivery of the commercial message to the user.

One more specific object of the present invention is to provide a mechanism enabling the coin station user provide real-time feedback by selecting messages or services or taking other action via responsive data entered at the coin telephone station keypad by the user.

A further specific object of the present invention is to provide a coin message and management system which effectively supervises a plurality of conventional coin telephone stations thereby to offer and provide expanded service thereto, including delivery of advertising and other useful messages to a user thereof, obtaining and collecting user response data and feedback from the user, and providing additional and further service including delayed message delivery from an automated message and data platform, and or busy/redial service.

One more specific object of the present invention is to provide a coin message and management system which is responsive to the signaling conditions capable of being generated at a conventional coin telephone station and which operates in response to detection of the signaling conditions in a manner adding substantial new features to the station without modification to or interference with the station or its associated automated coin subsystem.

Yet one more specific object of the present invention is to provide a coin message and management system which may replace a conventional central office automated coin subsystem with a subsystem providing coin telephone stations with vastly expanded functional capabilities including message delivery and interactive user response.

In accordance with the principles of the present invention, a coin telephone message and management system is provided for use at a central office location of a telephone system with a plurality of conventional remotely located coin telephone stations and with, or in place of, an associated automated coin subsystem to which the coin telephone stations are connected by coin trunks. The coin telephone message management system comprises a plurality of programmable line interface units each being connected to a said coin trunk for monitoring electrical signals present on the coin trunk indicative of usage of the station connected thereto, for delivering predetermined messages to a user of the station, and for generating electrical signals for controlling the automated coin subsystem; a message storage and delivery unit selectively connectable to the programmable line interface units for delivering at least one selectable audio message to the user of a said station via the coin trunk; and, a programmed system controller for coordinating operations of the programmable line interface units and the message storage and delivery of selected messages or message segments to the user of a said station, whereby each line interface unit may respond to data entered by the user of a said station and cause electrical control signals to be generated for controlling the coin telephone station and for controlling the central office switching equipment.

In one aspect of the present invention, the message storage and delivery unit comprises digital store for storing said messages in digital format in a digital storage medium and further includes a message delivery controller for causing said messages to be read from the digital store and a digital to analog converter for causing said digital format messages to be converted to analog electrical signals for delivery to said user via said line interface unit.

In a further aspect of the present invention, a modem is provided for enabling the programmed system controller to be connected to the telephone system thereby to enable transfer of data, messages for users and programs to the system and for receiving data collected by the system at a remote control location.

In one more aspect of the present invention, the telephone system further comprises a message and data platform, and the programmed system controller is programmed to cause a line interface unit means to generate dial signals enabling connection of a said coin telephone station with said message and data platform in response to a request from the coin station user in response to a said message delivered thereto.

In yet one more aspect of the present invention, each of the plurality of line interface units includes circuitry for monitoring calling sequence signaling conditions present on the coin trunk with which the line interface unit is connected.

In still one more aspect of the present invention, each of the plurality of line interface units includes circuitry for detecting DTMF dial up sequences, dial tone, ring back, called party busy signaling conditions and includes circuitry for detecting coin deposit tone signalling conditions and for generating coin deposit tone signalling conditions for thereby controlling the automated coin subsystem.

These and other objects, aspects, advantages and features of the present invention will be more fully understood and appreciated upon consideration of the following detailed description of a preferred embodiment, presented in conjunction with the accompanying drawing.

BRIEF DESCRIPTION OF THE DRAWINGS

In the Drawings:

FIGS. 3a and 3b together form a detailed block and schematic circuit diagram of one presently preferred system controller unit of the type included within the FIG. 1 system.

FIGS. 8A, 8B, 8C, 8D, 8E, 8F, 8G, 8H, 8I, 8J, 8K and 8L comprise scripted control program flow chart for dynamically controlling operations of one of the line interface units of the system depicted in FIG. 1 in accordance with a programmable message script.

DETAILED DESCRIPTION OF A PREFERRED EMBODIMENT

Figure 1:
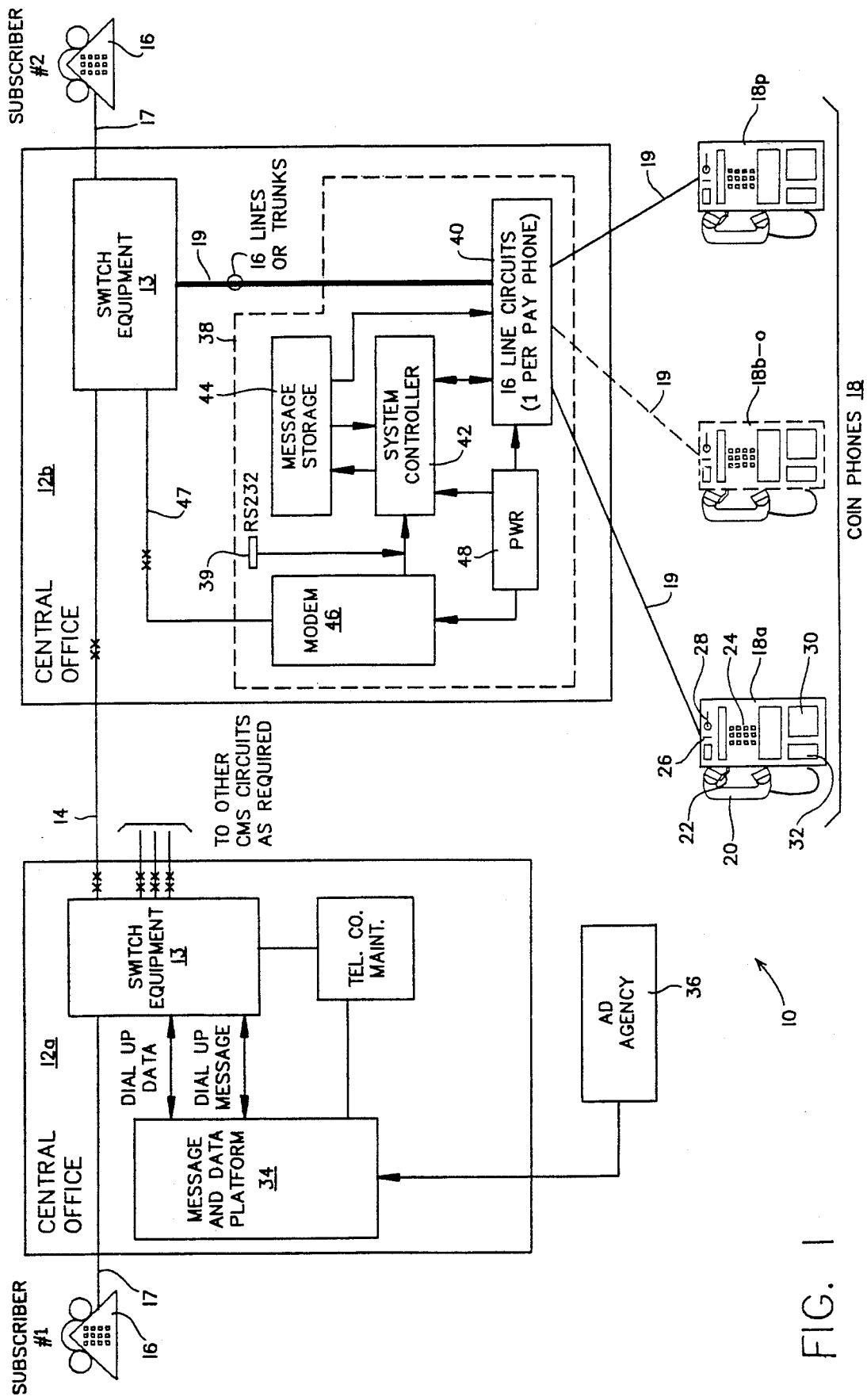
FIG. 1 is a block diagram of a call message service system for use with a coin telephone network in accordance with the principles of the present invention.
Figure 7:
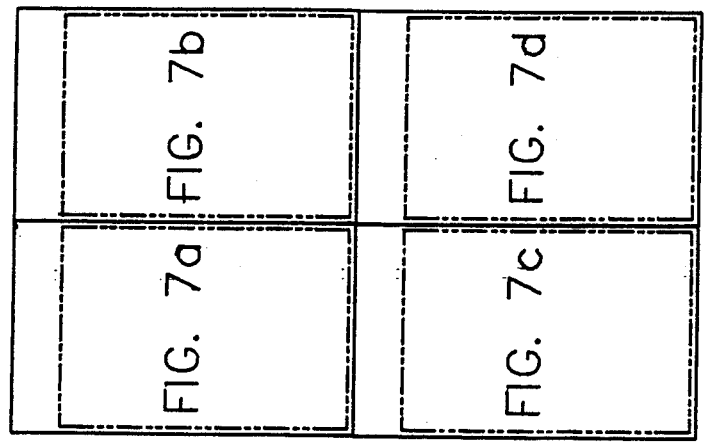
FIG. 7 is a layout plan for the FIGS. 7a, 7b, 7c and 7d diagram.

FIG. 1 depicts a preferred embodiment of the present invention situated within a subscriber telephone system 10. In overview, the telephone system 10 includes a plurality of central offices 12 (two central offices 12a and 12b are shown by way of illustration). Each central office 12 includes call switching equipment 13, usually ESS switches. The central offices 12 are typically connected together in conventional fashion by a network of local and/or long distance trunks 14. In the case of long distance trunks 14, one or more long distance carriers may provide toll trunk interface service to each central office 12. Each central office 12 serves as a switching point for switching calling signals and calls to and from a multiplicity (such as 10,000 or more) subscriber service telephones 16 which are connected directly to the central office 12 by subscriber service tip and ring line pairs 17.

Each central office may also serve a plurality of coin telephone stations 18. Sixteen coin telephone stations 18a-p are shown connected to the central office 12b by coin service tip and ring pairs 19 The coin service tip and ring pairs 19 may lead through switch equipment 13 at the central office 12 to special coin service controller equipment, such as the automated coin subsystem disclosed in the referenced Dudonis U.S. Pat. No. 4,031,324, for example; or the service pairs may be conventional subscriber service pairs which are adapted by the apparatus of the present invention into service as coin service pairs.

The coin telephones are typically, but not necessarily, of a conventional, Bell system standard configuration, and include a handset 20, cradle 22, twelve key DTMF (TOUCHTONE tm) keypad 24, coin deposit slot 26, manual coin return lever 28, internal escrow chamber (not shown), coin vault 30 and coin return receptacle 32. Conventionally, each coin telephone station 18 provides direct access to its associated central office 12. With "dial-tone-first" coin station service, conventional access would be a dial tone. With "coin-first" coin station service, no access is provided until a minimum denomination of coins is deposited at the coin telephone station 18.

After removing the handset 20 from its cradle 22 and hearing the dialtone in the earpiece of the handset 20, the user then may enter five or seven, or more, numbers at the keypad 24 in a sequence appropriate to reach a desired called station. The automated coin subsystem then generates an audio prompt message and sends it to the coin station earpiece, for prompting the user to deposit an indicated amount of coinage as is determined by the automated coin subsystem to be required to pay for the call as entered at the station 18.

As each coin is inserted through the coin slot 26, a tone or chime generator within the coin station 18 signals deposit to the automated coin subsystem, and it monitors and accumulates these coin deposit signals. Alternatively, the coin station 18 may internally count coin deposits and generate a coin chime or tone only when sufficient coinage for a minimum call is on deposit in the escrow chamber. Once the requisite amount of coinage is on deposit and that fact is signalled over the coin trunk, the automated coin subsystem generates an acknowledge audio prompt, and thereupon enables the switch equipment 13 to complete the call as it would for a conventional subscriber station 16. Overpayments are acknowledged audibly with an indication of additional credit. Conventionally, the coin station 18 generates a small control current between the tip wire and ground when a coin is in place in the escrow chamber. This signal current enables the automated coin subsystem to determine that a coin is present in the escrow chamber at any time, even if the coin deposit chime signal is not detected.

During the call, the automated coin subsystem continually monitors its progress and duration; and, periodically, the automated coin subsystem may interrupt the call in progress and require via an audible prompt that the user of the station 18 deposit more coinage in an amount indicated audibly before permitting the call to continue. This conventional coin service as generally implemented within the United States is described in *Feature Specific Document No.* 10-01-0000, published by Bell Communications Research in Dec. 1984.

The telephone service company may also provide a message delivery service, which is either manual or automated. Manual message delivery is described in *Feature Specific Document No.* 80-01-0200, also published by Bell Communications Research in Dec. 1985 and revised in Dec. 1986. This referenced document describes a mechanism by which an operator may deliver a predetermined message to an indicated called party at a time or times indicated by the calling party. Automated message delivery, sometimes referred to as "voice-mail" is described, for example in the referenced Cornell et al. U.S. Pat. No. 4,221,933.

In the telephone system 10 illustrated in FIG. 1 hereof, the central office 12a includes a message and data platform which may be the same as or similar to the message storage system described in the referenced Cornell et al. '933 patent noted above. The message and data platform 34 is adapted to store both voice messages and data messages as digital values. Telephone subscriber sets 16 may have direct dial-up access to the message and data platform 34 and messages may be deposited therein for later delivery to designated called party stations. In accordance with principles of the present invention, one service subscriber for message delivery is an advertising agency 36. The advertising agency 36 generates a plurality of advertising messages, surveys, public service announcements, etc., causes these messages to be converted into digital values, and then sends them via the telephone system 10 to the message and data platform 34 for storage and download to other central offices, such as the central office 12b serving the sixteen coin telephone stations 18.

A programmable coin telephone message and management system 38 in accordance with the principles of the present invention is located at the central office 12b and connects between the coin service lines 19 and switch equipment 13 thereof. Alternately, the telephone message management system 38 may replace the coin trunk equipment and serve as the primary automated coin subsystem, and with vastly expanded functional capabilities over conventional automated coin subsystems.

The controller 38 includes sixteen remotely programmable line interface units 40a-p. The line interface units 40 are controlled by a remotely programmable system central controller 42, which may be a dedicated controller, or which may most preferably be a personal computer, such as an IBM Personal Computer, or equivalent. A message storage and delivery unit 44 is provided for storing and delivering messages to the coin station user in accordance with a script downloaded to and executed by the associated line interface unit 40. Preferably, the message storage and delivery unit 44 includes a store of selectable messages and segments, recorded on a suitable mass store device, such as an optical write-once, read memory (WORM) and with message buffer memories providing real time random access selectivity to messages, according to the downloaded script for each coin telephone station.

The subsystem 38 may also include a modem 46 which is directly connected between the controller 42 and the switch equipment 13b via a dedicated service line pair 47. The modem 46 enables a direct remote control and reporting connection to be made from a supervisory location to the subsystem 38. Data collected by the subsystem 38 may also be forwarded to a remote location via the modem 46. A power supply unit 48 provides suitable operating power and voltage levels for the other circuits comprising the subsystem 38. The power supply unit 48 may operate from central station battery, or it may covert AC power from the power mains, or both.

The units 40a-p, 42, 44, 46 and 48 may be conveniently formed on individual edge-guided plug-in circuit cards which are mounted within a single bay of an equipment rack and connected together by suitable back-plane wiring and cabling as is conventionally employed within the telephone equipment industry.

System Functional Overview

While there are numerous available functions and applications of the coin telephone message and management system 38, all of the functions and applications make use of the ability of the system to monitor signaling conditions and activities on the coin trunk 19, selectively to generate signalling conditions and audible messages for delivery to the user, and to collect and report data arising from use of each coin telephone station 18 being supervised and controlled.

One application of the coin message and management system 38 is to deliver advertising messages to users of the coin telephones 18 in a way which is apt to assure that the commercial message has been delivered effectively and which exchanges credit for coin telephone service for the user's participation in the advertisement. In this preferred application of the coin telephone message and management system 38, a user removes the handset from one of the supervised coin telephone stations 18, and instead of receiving dialtone, immediately begins to hear a commercial message from the system 38. The commercial message may be subdivided into several parts. For example, a national beauty care manufacturer or group of manufacturers may design a telephone advertisement for skin care which includes portions tailored to different populations and/or ages. During the delivery of the advertisement to the user, the user is asked to provide some background information, such as male or female, and age grouping, by entering appropriate values (spelled out in the ad) at the keypad 24. These values are detected by the line interface unit 40 and passed on to, and recorded by, the system controller 42, whereupon a further segment of the advertisement selected by the keyboard values entered is generated by the audio message storage unit 44 and sent to the user. A similar approach is taken with surveys requiring user response, wherein the user responses are collected by the system controller 42 and then may be returned to the message and data platform 34 for readout and tabulation by the advertising agency 36 or pollster. The system controller 42 may easily keep track of activity at each coin telephone station being supervised, so that data are collected and reported for each location. The system controller 42 also supervises script control program execution by each line interface unit 40, and may download revisions and replacement scripts to each line interface unit periodically, or between each call, so that different commercial messages may be delivered to subsequent users of each coin telephone station 18.

Once the advertisement or survey is successfully completed, the user is given a preannounced credit toward coin calling. This may be provided either by action of a coin deposit tone generator included within the line interface unit which operates to inform the conventional automated coin subsystem of a "coin drop"; or, when the system 38 is acting as an automated coin subsystem, by entry of an internal credit value in a storage register. The credit may be part of, or all of, the amount needed for a local call. A timer may be set when the credit is given, if a time limit is imposed for local calling by the telephone company offering this service.

The user may desire to make a call without first listening to a commercial message, and may override the message as by dropping a coin into the coin slot 26 of the coin telephone station, or, alternatively, by pressing a predetermined key of the keypad 24, such as the zero key. In either case, a coin drop tone or a DTMF signal from the zero key is sensed by the line interface unit 40, and it acts to disconnect the message delivery function from the coin telephone station 18 and permit conventional calling operations of the coin telephone station. If a coin has been dropped, the system 38 may be programmed to record that fact and keep track of all coin-deposit credits of the user, and offer post calling services, such as message store and forward or busy signal/redial services, depending upon choices entered by the user in response to audio message prompts generated by the message and management system 38.

The coin telephone message and management system 38 may offer a plurality of message handling services in addition to providing service credit by advertising. For example, after delivering an advertisement and after the user's calling information is received and the call is placed, the line interface unit 40 may be programmed to monitor the called party's line status. If no one answers after a predetermined number of ring back signals have been detected, or if a line busy signal is detected, an audio prompt generated by the message storage unit 44 may invite the user to leave a message in the message and data platform 34. If the user selects this service, the line interface unit 42 establishes a dial-up path to the platform for the user and permits the user to leave a message for later delivery to the called party who either was not available or whose line was busy.

Alternatively, and for called party lines detected to be busy, the coin telephone message and management system 38 may provide a further announcement or message, such as late minute news, to the user during a waiting interval, and then automatically redial the number determined to be busy. This function is referred to herein as the "busy/redial" service option.

In addition, should the user desire message delivery service in lieu of direct dial communications, as for example when a message is to be delivered in a broadcast mode to a number of different recipients, the message and management system 38 will separate the coin telephone station from the service trunk and will deliver a message to the user while independently dialing up the message platform; once the connection is made to the platform, the station will be reconnected and the platform may then obtain the telephone number(s) to be called and store the message from the user for subsequent delivery.

The message and management system 38 automatically monitors each offered service and prompts the user to deposit an appropriate amount of coinage for each service, and/or also may provide credit earned through participation of the user in the advertisements and/or surveys, in accordance with a message script being followed at the time by the line interface unit servicing the particular coin telephone station 18 in use.

Safeguards may be provided by the message and management system 38, such as limiting the time of free calls and blocking repeat calls to the same called party within a certain time interval. This feature would prevent children and abusive users of the coin telephone station from tying it up endlessly in sequential calls to the same called party.

Many other features and uses can be readily designed and implemented for the message management system 38. As a feature is desired to be added or changed, digitized replacement message segments and revised scripted control programs for the line interface units may be downloaded via the modem 46 to the system controller 42 and respectively provided to the message storage and delivery unit 44 and the line interface unit(s) 40. Conversely, statistics and usage data collected at the system controller 42 may be offloaded via the modem 46, either to the message and data platform 34 or to some other location served by the telephone system 10.

The implementation of these and other features within the coin telephone message and management system 38 will be more fully appreciated by considering the following description of each major structural element of a preferred embodiment thereof.

Line Interface Unit Card 40

Figure 2:
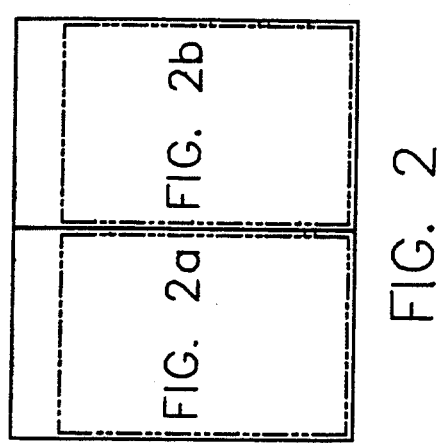
FIG. 2 is a layout plan for the FIGS. 2a and 2b diagram.
Figure 2A:
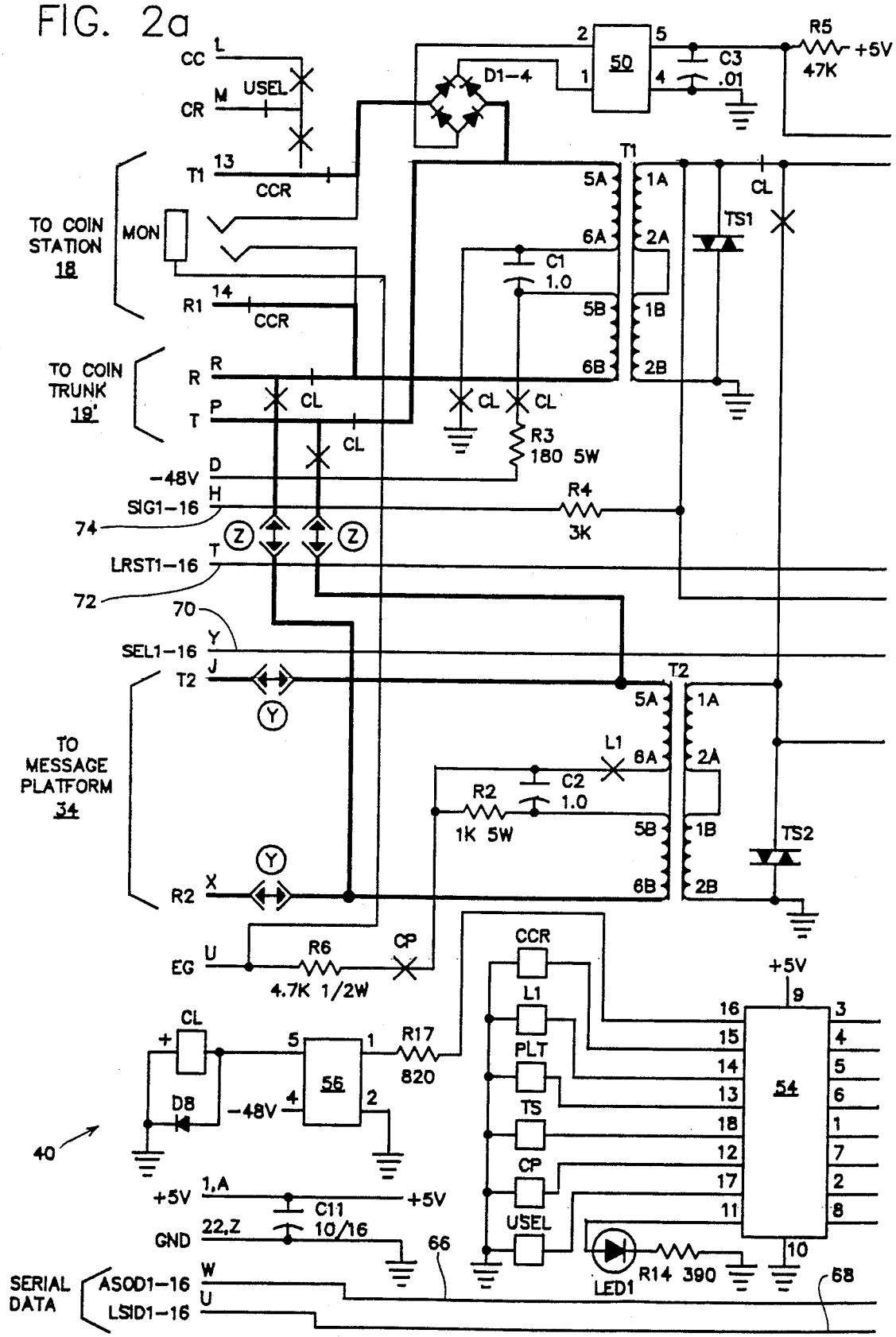
FIGS. 2a and 2b together form a detailed block diagram of one of the e.g. 16 line interface units of the type included within the FIG. 1 system.
Figure 2B:
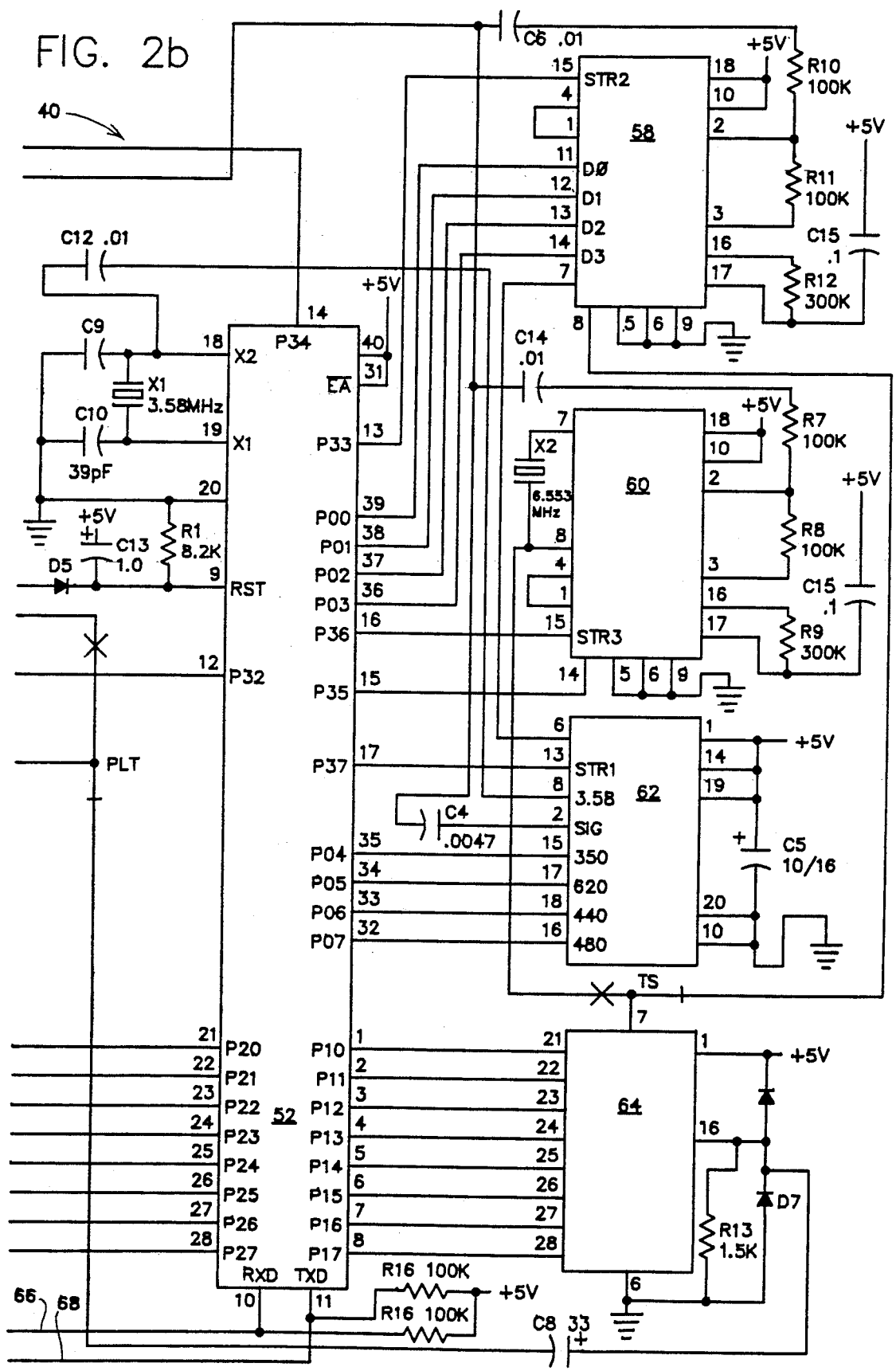

With reference to FIGS. 2a and 2b, one of the 16 identical line interface units 40 is detailed. Each unit 40 services one coin telephone station 16, and it is interposed between the line pair 19 leading to the particular station 16 and an internal central office line pair 19' leading to the switch equipment 13 and or the conventional automated coin subsystem. While 16 line interface units are presently most preferably included within the message and management system 38, lesser or greater numbers of such units 40 are readily included in the system by use of conventionally known banking techniques, etc.

The tip-ring wire pair of the line 19 is denoted in FIG. 2 as T1 and R1; and, the wire pair of the line 19' is denoted as T and R. T1 leads through a diode bridge D1-4 to a line transformer T1 which returns as wire R1 (and wire R) The T wire is connected directly to the transformer T1 and bypasses the bridge D1-4.

An optoisolator 50 is connected across the diode bridge D1-4 and detects when loop current is flowing in the T1 and R1 pair 19 leading to the coin telephone station 18 associated with the particular line interface unit 40. (Loop current will flow when the handset 20 is taken off-hook, thereby denoting a request for service by a user of the coin telephone station 16). An output from the optoisolator 50 extends to a hardware interrupt port P34 of a programmed microcontroller 52, which may be an Intel type 8051 (internal ROM) or 8031 (external ROM), or equivalent. The microcontroller 52 is clocked at a 3.58 MHz clocking rate as fixed by a crystal Xl, and it has a number of input/output ports which extend to other elements of the line unit 40.

One port of the microcontroller 52 extends to a relay driver 54 which directly operates the armatures of six 5 volt relays: CCR, L1, PLT, TS, CP and VSEL, and which indirectly operates, through an opto-isolator 56, a 48 volt relay CL. The contacts of the relays CCR, L1, PLT, TS, CP, VSEL and CL are denoted in conventional telephone art symbols with normally closed contacts being denoted by a short line intersecting a conductor, and with normally open contacts denoted by an X through a conductor, together with the relay symbol in proximity therewith. The cut line (CL) relay operates to separate the coin telephone station 18 and its external line pair 19 from the central office coin trunk 19' (or a dedicated trunk line pair T2/R2, depending upon the state of Y—Y and Z—Z jumpering at the line interface unit 40), so that the line unit 40 may communicate in separated paths to the coin telephone station over one path and to the central office switching equipment (or message platform) over the other. This arrangement permits messages to be delivered to, and responses obtained from the coin station user while the system 38 independently generates dialing signals to the central office switching equipment, such as for message storage and delivery and/or busy/redial services.

The voltage select (VSEL) relay selects between central office coin return (−130 V) and coin collect (+130 V) voltages on the T1 wire of the coin trunk 19, while the coin collect and return (CCR) relay separates the line interface unit 40 upstream of the central office coin collect and coin return lines leading to the coin trunk 19. The coin path CP relay provides a signal to ground return path to the normally minus 48 volt ring wire which emulates a signal put out by the coin telephone station when a coin is present in the escrow chamber of the coin telephone station. This feature is required in order to emulate coin drop and coin present signalling conditioning for controlling a conventional automated coin subsystem if it is being used in conjunction with the system 38.

The L1 relay selectively provides a DC path through the primary of a second line transformer T2, so that a central office loop may be established through the transformer T2 when the CL relay has disconnected the coin telephone station from the central office trunk. This allows dialing tones to be generated and sent via the transformer T2 to the central office switching equipment.

A light emitting diode LED1 is also controlled by the microcontroller 52, and may be used to visually signal status of the line interface unit via flash sequences emulative of Morse Code. Such capability enables rudimentary on-board ciagnostics to be carried out by the microcontroller 52 and any malfunctions thereupon visually signalled to service personnel.

A second line pair T2/R2 may be optionally provided at each line unit 40 and hard wired at the unit by jumpers Y—Y in lieu of the coin trunk 19'. The line pair T2/R2 is a dedicated line leading directly to a specific interface, such as the message platform 34, for example; and, such direct connection enables communications between the message platform and the line unit to occur directly, should that arrangement be advantageous. When the dedicated line pair T2/R2 is jumpered in place by the jumpers Y—Y, jumpers Z—Z are removed, thereby disconnecting the coin line trunk 19'. The second line transformer T2 has a primary connected across the coin line trunk 19' or the dedicated line pair T2/R2.

Port P33 of the microcontroller 52 selects a DTMF receiver circuit 58 which is normally connected to the secondary of the transformer T1 via a CL relay contact set, and which is connected to the secondary of the transformer T2 when the CL relay is activated. The DTMF receiver circuit 58 monitors the coin trunk line 19 and decodes DTMF signals generated at the keypad 24 and converts those tones into a hexadecimal value present on four bit lines leading to ports P00, P01, P02 and P03 of the microcontroller 52. The DTMF receiver circuit also operates at a 3.58 MHz clock frequency.

Port P35 of the microcontroller 52 operates a DTMF receiver 60 adapted by use of a 6.553 MHz crystal controlled oscillator to detect coin deposit tones generated at the coin phone station 18. The receiver 60 is also coupled to the line transformers T1 and T2 in parallel with the receiver 58. When a coin deposit tone is detected, the receiver 60 puts out a logical true signal to port P35 of the microcontroller 52.

Port P37 of the microcontroller 52 operates a line condition detector circuit 62. The line condition detector, implemented for example as type 982 made by Teltone, or equivalent, is connected to the line transformers TI and T2 in parallel with the circuits 58 and 60, and it provides a logical signal over four bit lines leading to ports P04, P05, P06 and P07 of the microcontroller 52. For example, the line condition detector circuit 62 detects the presence of dialtone, ring back signal, called party answer, called party disconnect, busy signal, equipment busy signal, etc., generates a binary value in accordance with the detected condition and sends it to the microcontroller 52.

A DTMF generator chip 64, such as type UM95809, is connected to ports P10, P11, P12, P13, P14, P15, P16 and P17 of the microcontroller 52 and generates DTMF tone combinations in accordance with the logical patterns present on these port lines from the microcontroller 52. When the microcontroller 52 operates the TS relay, the 6.553 MHz signal from the coin deposit tone receiver 60 is switched to the generator chip 64 in lieu of the 3.58 MHz clock signal from the DTMF receiver chip 58. In this mode, the generator circuit 64 is adapted to generate coin deposit, coin collect, and coin return tones under control of the microcontroller 52. The tones, whether DTMF or coin activity tones, are applied either through the T2 secondary except when the PLT relay is operated by the microcontroller 52. Audio information supplied by the message storage circuit 44 is applied to the secondary of T1 via an audio line 74 and may be selectively applied to the secondary of T2 when the PLT relay is operated.

The microcontroller 52 may readily be provided with reprogrammable external program read only memory space by the addition of an EEPROM chip and suitable addressing and rewriting circuitry readily known to those skilled in the art. In this manner, not only the script, but the overall FIG. 8 control program of the microcontroller 52 may be dynamically updated or changed as additional applications of the system 38 are called for. The random access read/write memory associated with the microcontroller 52 has sufficient storage capacity to store each script downloaded from the system controller 42 for controlling message delivery/user responses at the coin telephone station.

The microcontroller 52 maintains direct communication with the system controller 42 by virtue of two serial data lines: a receive serial data line 66, and a transmit serial data line 68. The particular line interface unit 40 is selected by a select signal received over a single bit select line 70 from the system controller 42. The system controller 42 may reset the microcontroller 52 by sending a reset signal over a line 72 to a reset port of the microcontroller 52. A reset signal causes the microcontroller to execute a short initialization sequence which clears and presets registers, and which points the program pointer to a start label 200, discussed hereinafter in conjunction with the FIG. 8 scripted control program.

It is apparent that each line interface unit 40 under scripted program control may detect off-hook at its associated coin telephone station; may detect and decode the digits entered by the station user at the DTMF keypad 24, may detect and decode each coin deposit tone, may detect dialtone, ring back tone, answer by the called party and call completion, called party busy tone, and equipment busy tone. Further, under scripted program control, each unit 40 may generate DTMF dial tones and selectively put them out over the internal central office coin trunk 19' (or the dedicated trunk T2/R2), and may also generate coin deposit tones and selectively put them out over the same trunks. In addition, audio information may be selectively supplied to the station 18 via the transformer T1, or to the called party via the line transformer T2.

System Controller Card 42

Figure 3:
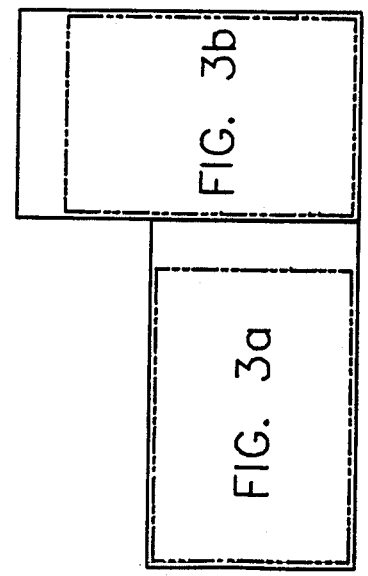
FIG. 3 is a layout plan for the FIGS. 3a and 3b diagram.
Figure 3A:
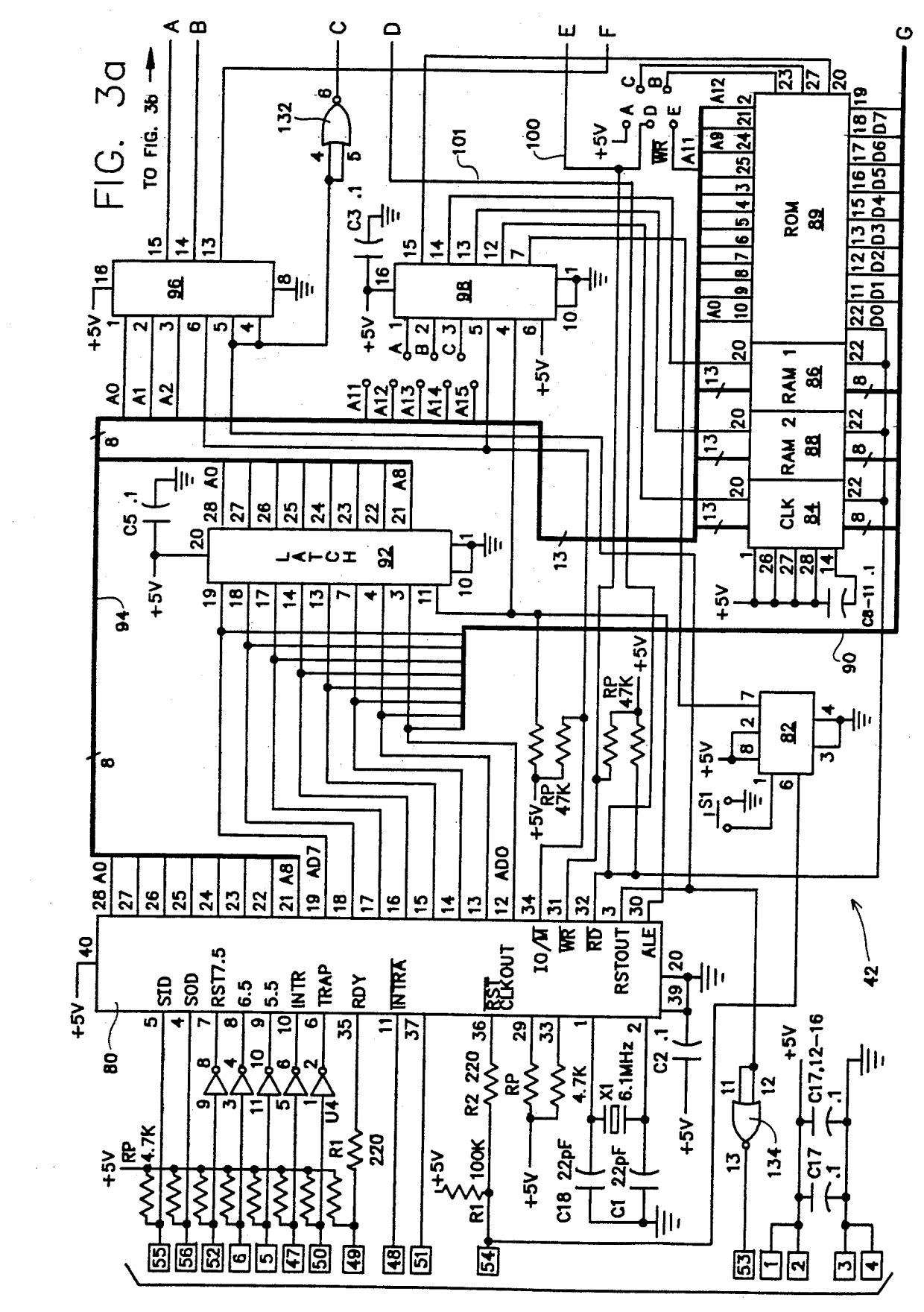
Figure 3B:
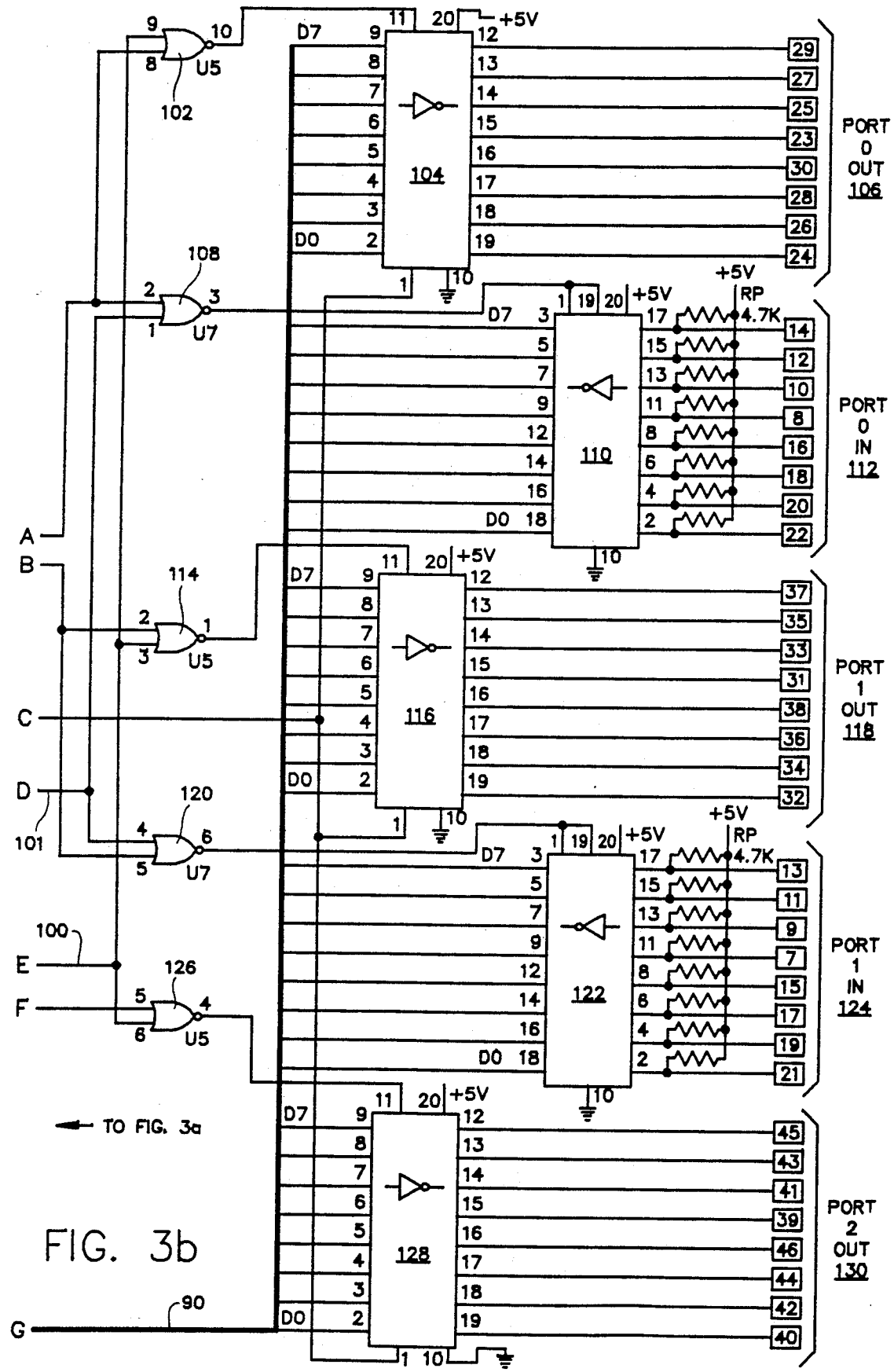

FIGS. 3a and 3b illustrate one presently preferred implementation the system controller 42 as including a low power programmable microprocessor 80, such as an Intel type 80C85, or equivalent. The clock cycle of the microprocessor 80 is 6.1 MHz as set by a frequency reference crystal X1. A watchdog timer circuit 82, such as type DS1232 made by Dallas Semiconductor, or equivalent, provides a reset signal for the microprocessor 80 from three separate sources. First, an internal pulse shaping circuit enables a manual switch S1 to be used to generate a system reset signal. Second, an internal power monitor causes a reset any time that the +5 volt main power supply falls below e.g. ten percent of nominal. Third, the absence of a software generated pulse at regular intervals (such as not to exceed 500 milliseconds, for example) also causes a reset pulse to be generated to reset the microprocessor chip 80.

A real time clock chip 84, such as a type 2DS1216, also made by Dallas Semiconductor, or equivalent, provides a real time clock for the message management system 38. Two 64 kilobyte random access memories 86 and 88, such as type CXK5864PN made by Sony Corporation, or equivalent, provide storage area for values generated during program execution and for accumulation of data bases comprising statistics and other information gathered during operation of the coin telephone stations 18 supervised by the controller 42. Updated program routines may also be contained in the memory area of the RAMs 86 and 88. A read only memory array 89, such as type D27C64 made by National Semiconductor, or equivalent, may be provided to store up to eight kilobytes of non-volatile program routines for execution by the microprocessor 80.

An eight bit digital data bus 90 extends from the microprocessor 80 to the other digital circuit elements of the system controller depicted in FIGS. 3A and 3B. The data bus is also used to provide the lower eight bits of sixteen bit address words from the microprocessor 80. These low order address bits put out over the data bus 90 are latched into an address latch 92 during each address cycle of the microprocessor 80. The latch 92 is enabled by the address latch enable (ALE) control signal put out by the microprocessor 80. The higher eight bits of the sixteen bit address words are put out directly to an address bus 94 from a separate port of the microprocessor 80. The address bus 94 extends to two decoders 96 and 98. The decoder 96 controls enablement of three data ports, and the decoder 98 selectively controls enablement of the clock 84, random access memories 86 and 88 and read only memory 89. Jumpers from address positions A11, A12, A13, A14 and A15 selectively made to ports A, B and C of the decoder 98 establish memory space boundaries for the clock 84, RAMS 86 and 88 and ROM 89. A jumper field drawn above the ROM 89 enables the write line 100 and the address line A11 to be selectively patched to enable data to be written to the RAMS 86 and 88 and the size of the ROM 89 to be set.

Figure 7A:
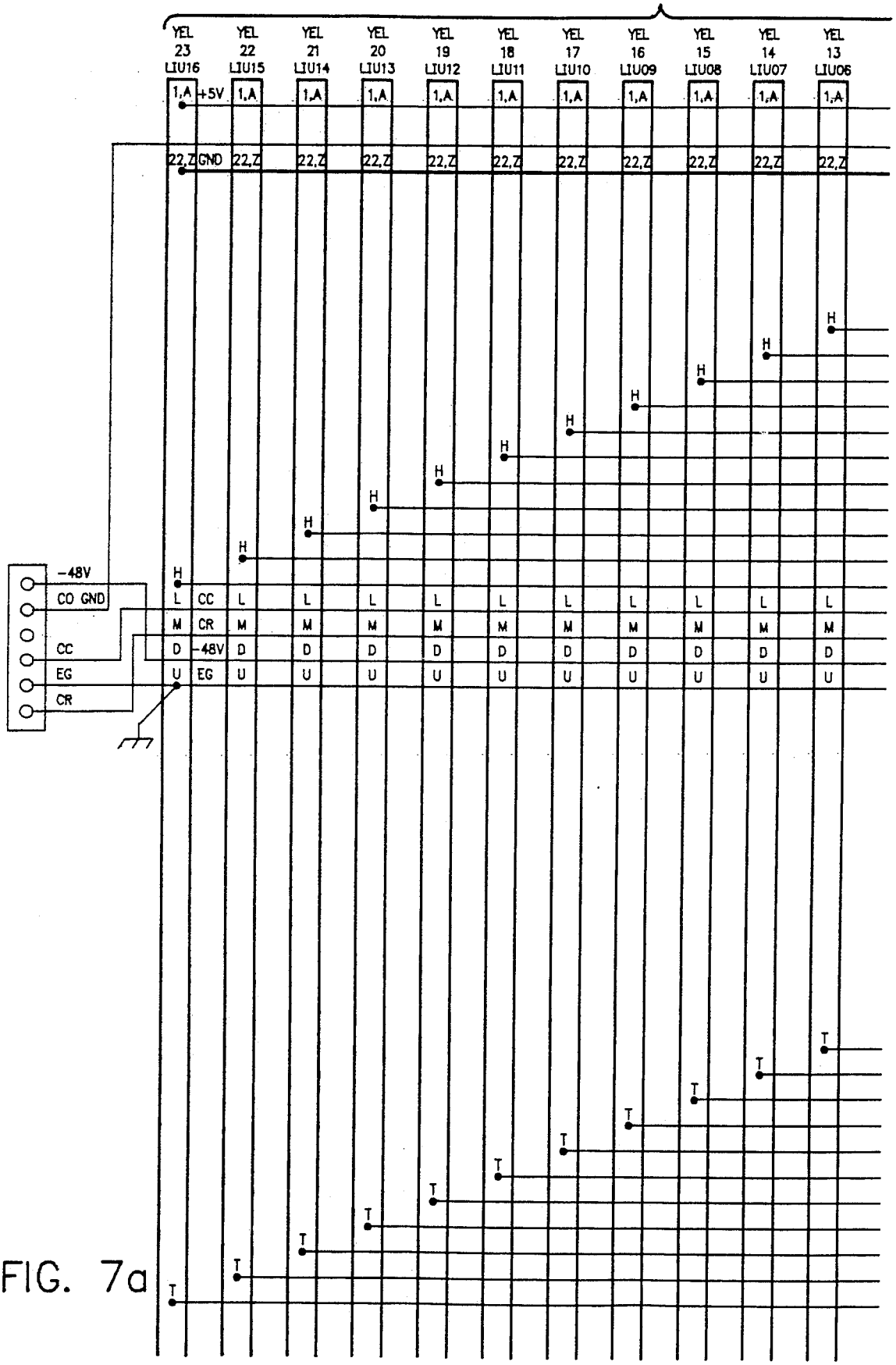
FIGS. 7a, 7b, 7c and 7d together form a backplane wiring diagram for interconnecting the FIG. 2, FIG. 3, FIG. 4, FIG. 5 and FIG. 6 circuit units.
Figure 7B:
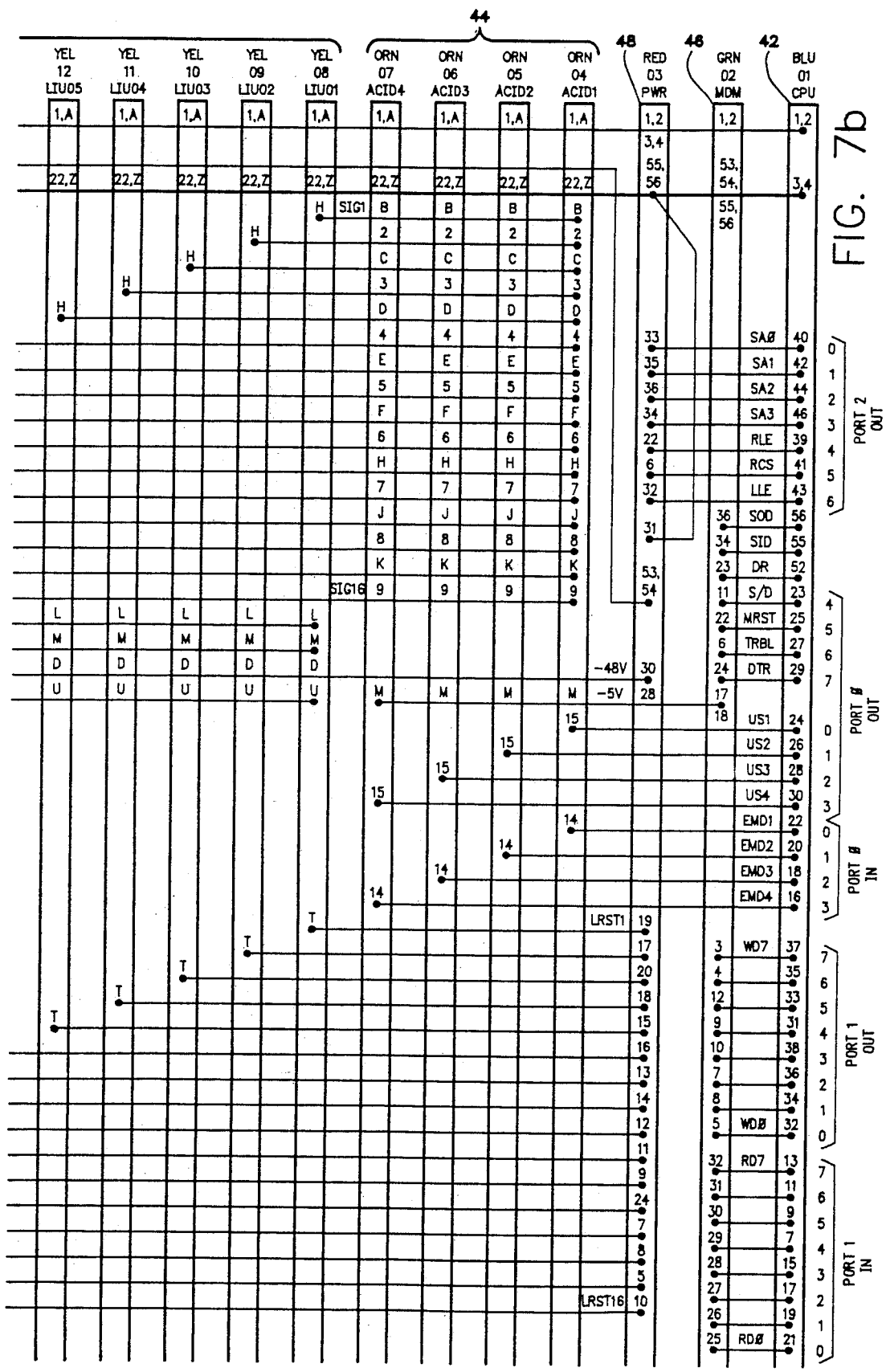
Figure 7C:
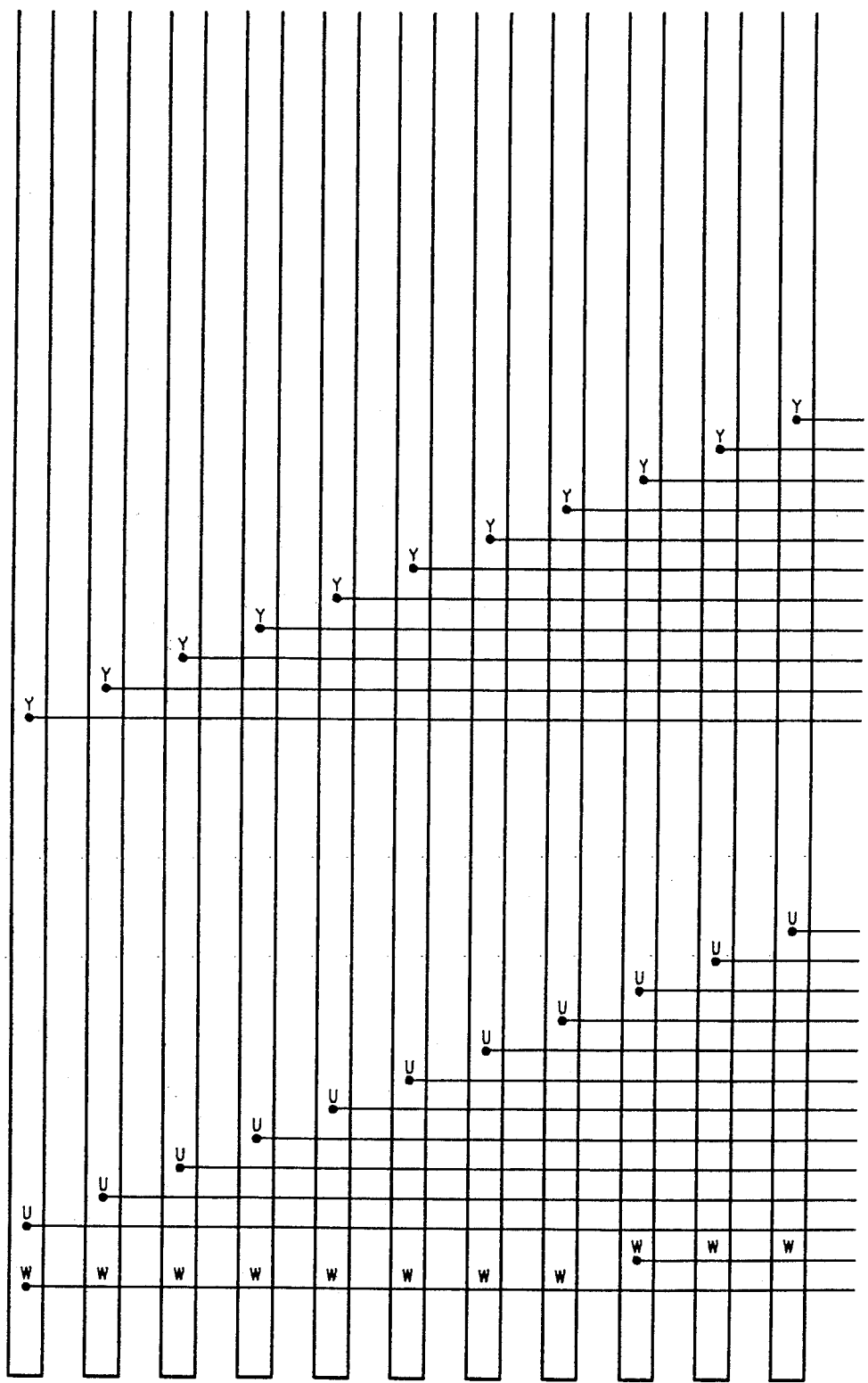
Figure 7D:
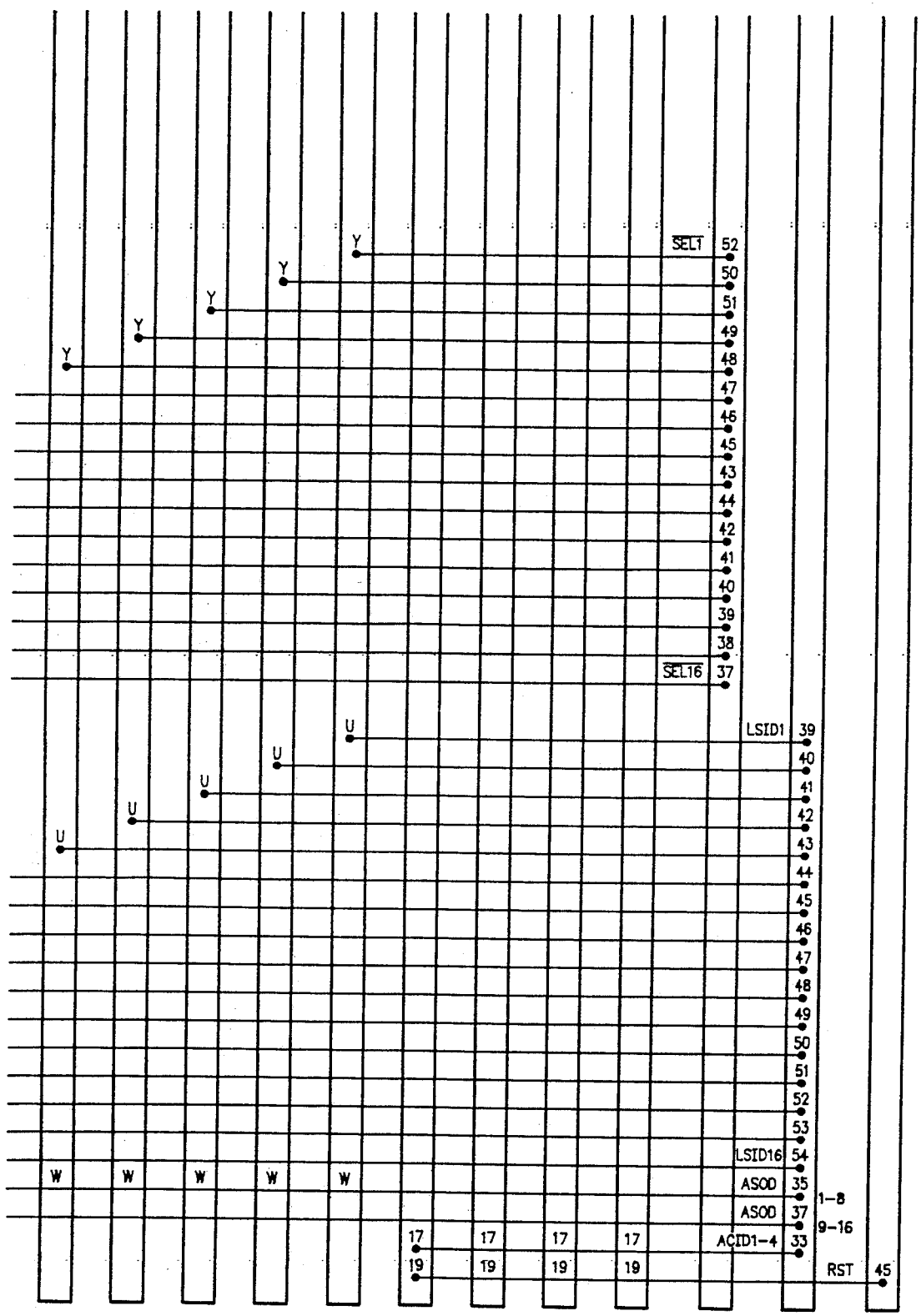

A gate 102, enabled by the decoder 96 and by the write line 100, selects a tri-state driver chip 104 to provide a first data output port 106. A gate 108 enabled by the decoder 96 and a read line 101 selects a tri-state driver 110 to provide a first data input port 112. A gate 114 enabled by the decoder 96 and the write line 100 enables a tri-state driver chip 116 to provide a second data output port 118. A gate 120 enabled by a line from the decoder 96 and the read line 101 selects a tri-state driver chip 122 to provide a second data input port 124. A gate 126 enabled by a line from the decoder 96 and the write line 100 selects a tri-state driver chip 128 to provide a third data output port 130. A reset out line (RSTOUT) from the microprocessor 80 resets the decoder 96 and leads through a gate 132 to reset the output port drivers 104, 116 and 128. A gate 134 extends the RSTOUT signal to other circuit elements (cards) of the message management system 38 via backplane connections (FIGS. 7A and 7B). Other control signals are carried on lines also extending to other cards of the system 38. The output ports 106, 118 and 130, and the input ports 112, and 124 are also connected at the backplane.

Alternatively, and equally preferably, the system controller 42 may be implemented as a personal computer, such as the IBM Personal Computer, or equivalent, operating under an appropriate disk operating system (DOS). In this implementation, an interface card in an expansion card slot of the personal computer enables connection of appropriate signal lines with the system backplane. Additionally, using conventionally available software with very little modification, the personal computer may keep track of coin telephone station activity by establishing suitable disk files at a hard disk drive for each station and recording in each file the activity occurring at each coin station.

Modem Card 46

Figure 4A:
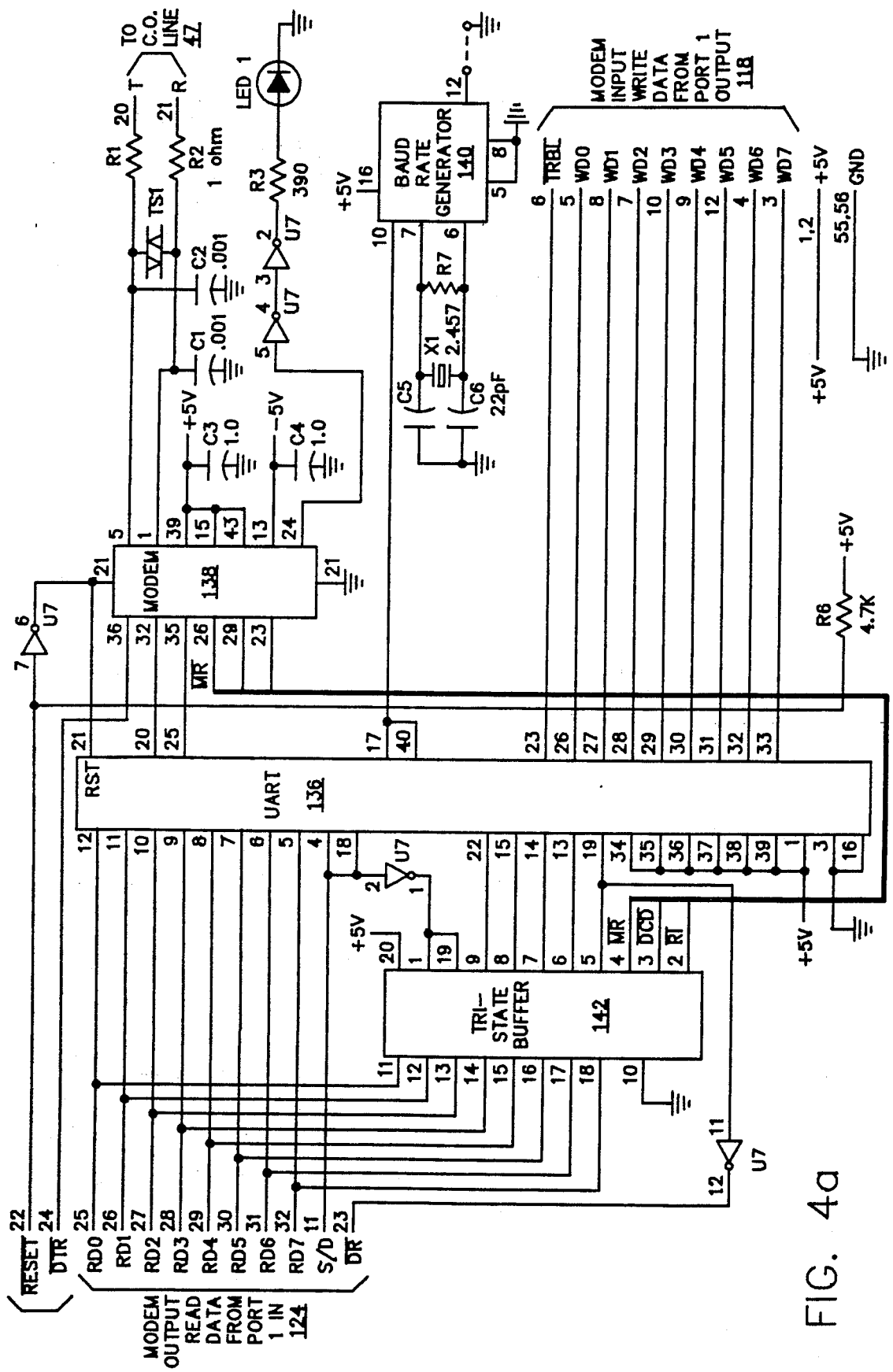
FIGS. 4a and 4b together form a detailed block and schematic circuit diagram of one type of plural message storage and delivery units which may be included within the FIG. 1 system.
Figure 4B:
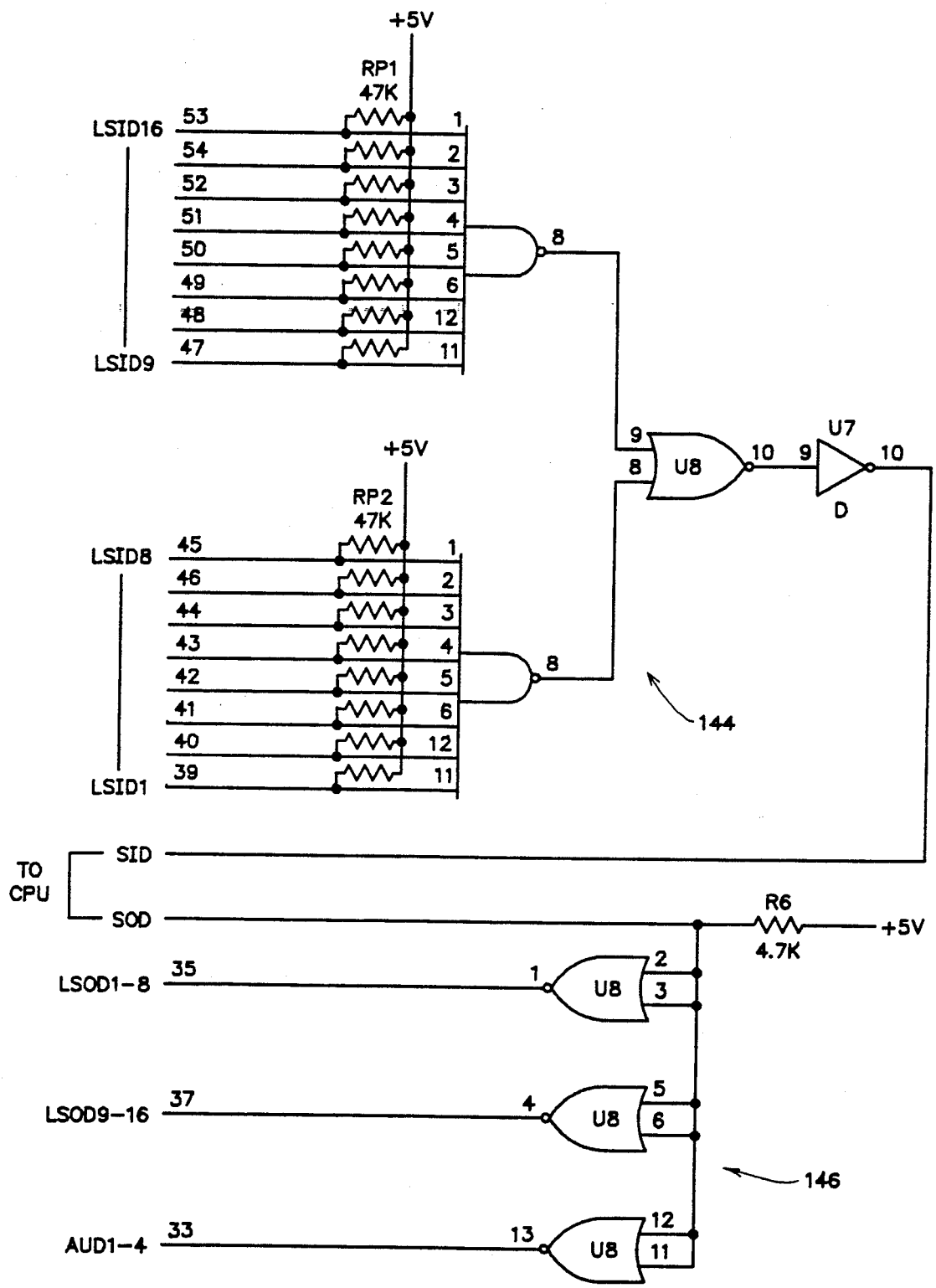

The modem card 46 is shown in FIGS. 4a and 4b. Therein, a UART chip 136, such as a type HD3-6402R-9 made by Harris Semiconductor, or equivalent, converts parallel word digital data to and from serial by bit data streams. Serial data is passed to and from a modem chip 138, such as a type CH17-L70 made by Cermetik, or equivalent. The modem chip 138 is adapted for direct connection to the central office switch via the dedicated tip and ring wire pair 47. Incoming serial bit sequences from the data platform 34, for example representing digitized messages for delivery to the user are received by the modem circuit 138, and outgoing data relating to user choices, station usages and coin collection totals and coin credits given to users for advertising messages actually delivered, etc., is sent via the modem circuit 139 and dedicated line 47 to the data platform 34 where it is accumulated and then used to bill the advertising agency (and in turn the advertiser) for coin service delivered in exchange for message delivery to the users.

A baud rate generator 140, such as a type HD3-4702-9 made by Harris Semiconductor, or equivalent, is connected to generate e.g. a 1200 baud rate for use by the UART chip 136. Data received by the modem 138 and converted to parallel by bit, byte format by the UART chip 136 enters the second input port 124 of the system controller 42. A tri-state buffer 142 enables certain status bytes from the UART chip 136 to be formed and placed onto the system controller's second input port 124. The second output port 118 provides a digital input to the UART 136 and enables data from the system controller 42 to be sent out by the modem 138 over the dedicated pair 47. A gate network 144 connects to sixteen serial data transmit lines (LSID) 68 from each of the line interface units 40 in order to concentrate serial data from an enabled line interface unit and pass it to a serial incoming data (SID) port of the microprocessor 80. An array of gates 146 buffers and amplifies the serial outgoing data stream (SOD) from the microprocessor 80 and passes it to each serial read data port of each line interface unit microcontroller 52. Outgoing serial data is also passed to the four message storage cards 44 included within the system 10.

In those applications where the system controller 42 is implemented as a personal computer, the modem 46 is preferably implemented as an expansion card installed in an expansion slot of the personal computer and operated under conventional telecommunications applications software readily installed in the personal computer and used in conjunction with the disk operating system.

A local RS-232 serial data port 39 (FIG. 1) may also be provided to enable local digital access to the system 38 for control and/or maintenance purposes. The port 39 thereby enables the control programs and scripts of the system 38 to be monitored and changed at the installation location of the coin message and management system 38

Message Storage and Delivery Card 44

Figure 5:
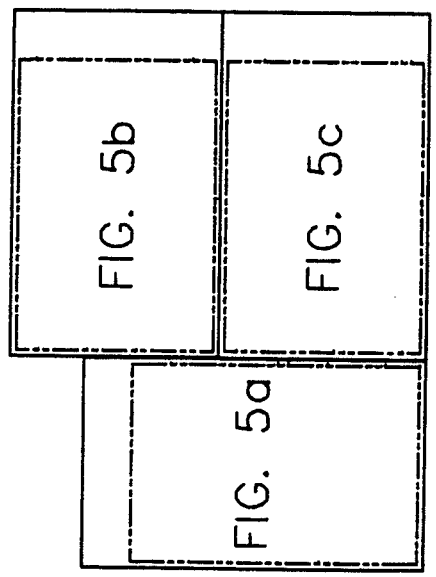
FIG. 5 is a layout plan for the FIGS. 5a, 5b and 5c diagram.
Figure 5A:
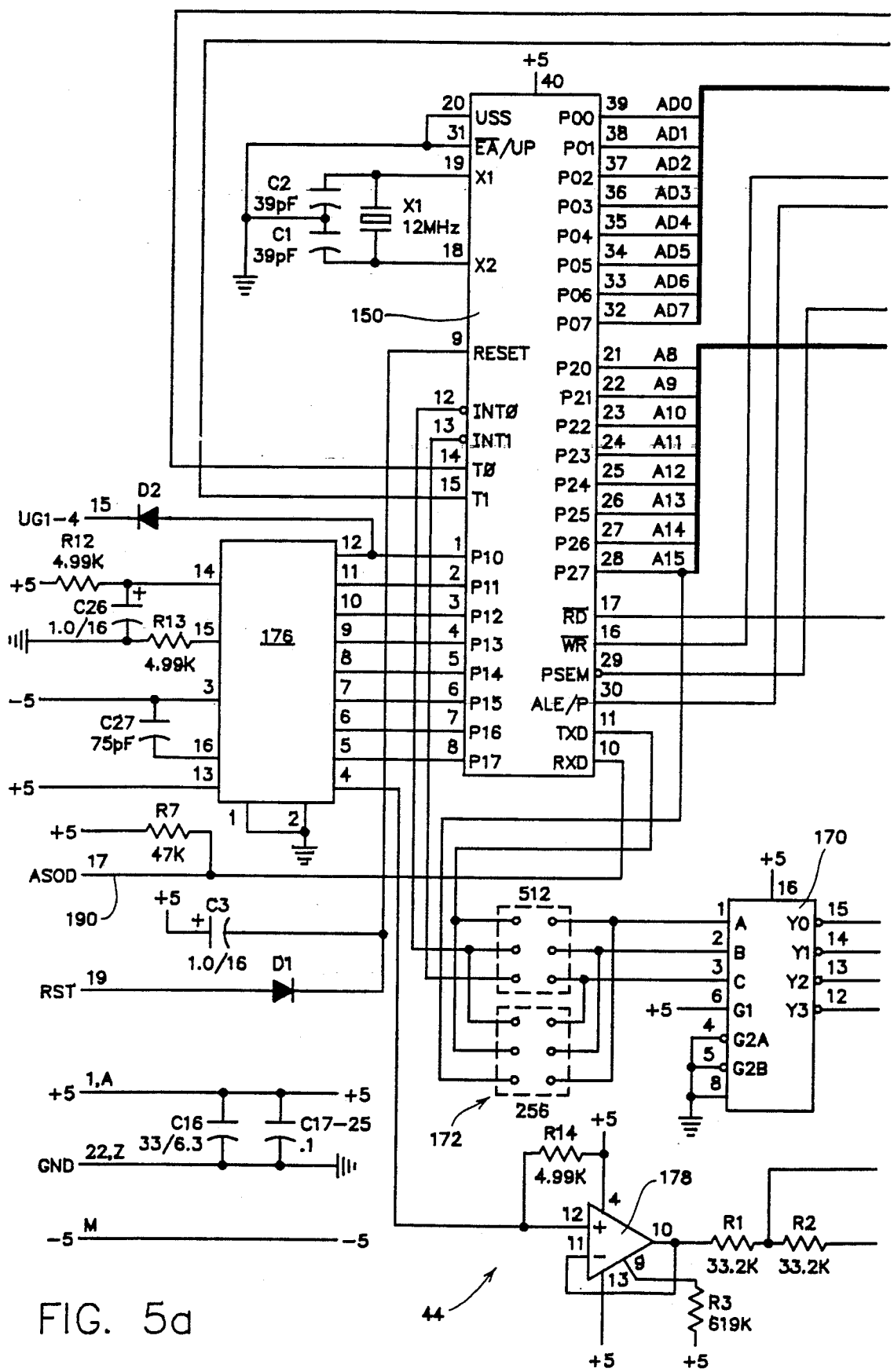
FIGS. 5a, 5b and 5c together form a detailed block and schematic diagram of a modem unit of the type included within the FIG. 1 system.
Figure 5B:
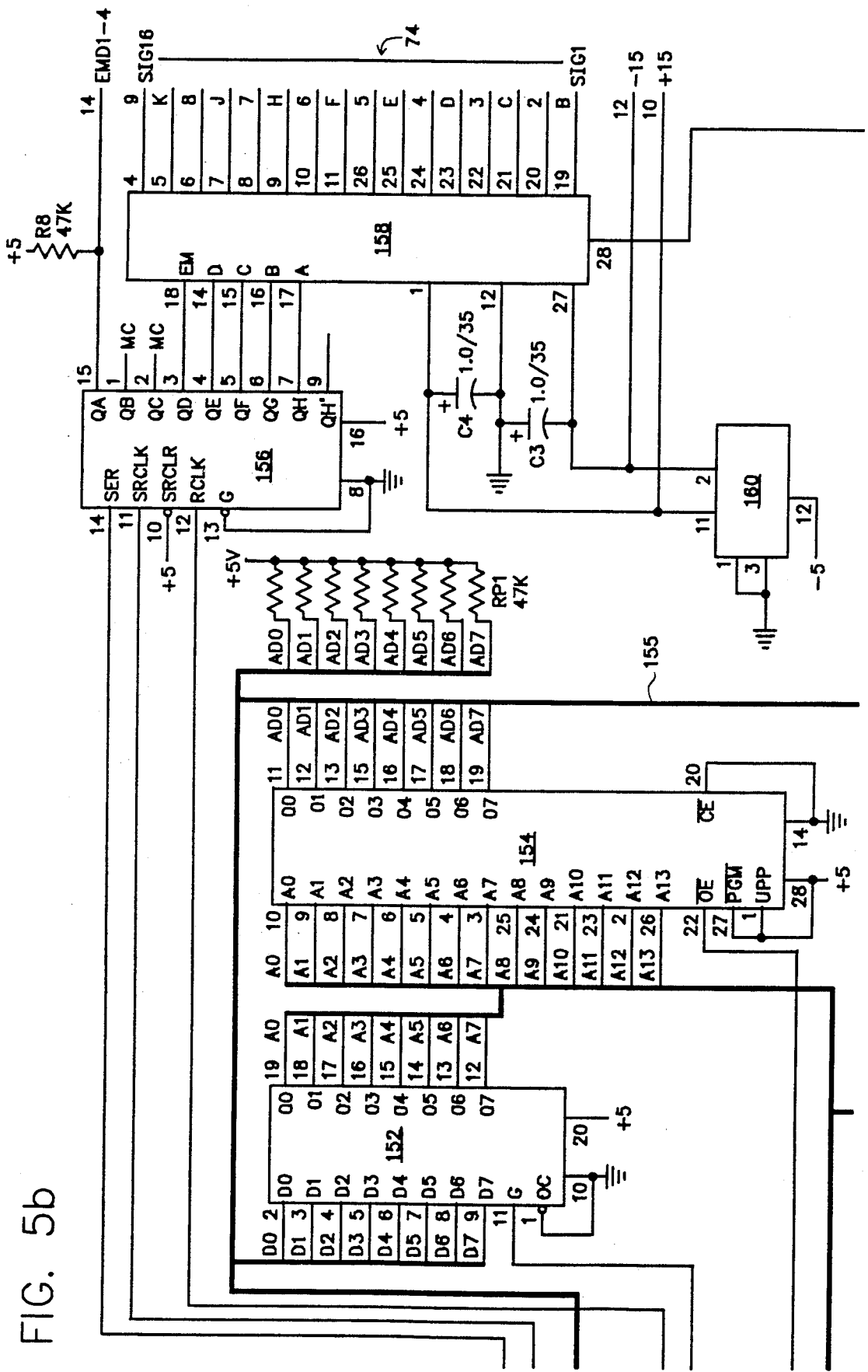
Figure 5C:
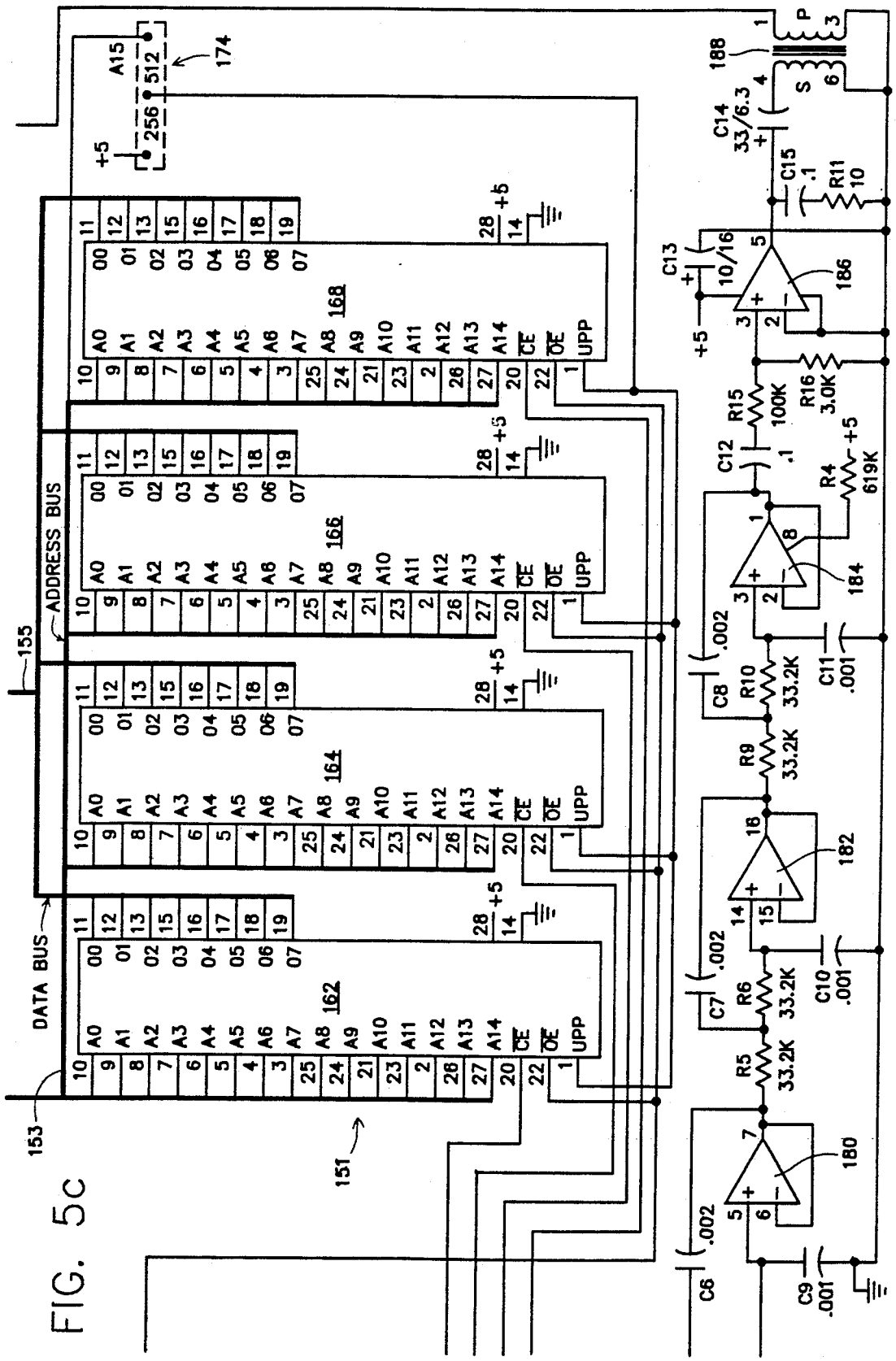

One preferred embodiment of a message storage and delivery unit, for delivering prestored messages, is depicted in FIGS. 5a, 5b and 5c. Therein, a high speed microcontroller 150, such as a tpe 8031 by Intel, or equivalnt, which is clocked at a 12 MHz rate by a crystal reference XI controls readout of digital values from a memory array 151. The digital values are converted into analog signals, amplified and processed into messages and then selectively delivered to one of the line cards over its SIG line 74.

Connected to the controller 150 is a low byte address separator 152 leading to an address bus 153 and a program memory 154 which is addressed by the address bus and which puts program instructions out over a data bus 155. A decoder 156 controls an analog selector 158 to select one of the SIG lines 74 for delivery of the reconstructed audio message. A power converter 160 converts a minus 5 volt bus supply voltage into a plus and minus 15 volt supply which is required by the analog selector 158. The selector 158 may be type H13-506A-5 made by Harris, or equivalent.

The memory array 151 may be comprised of a plurality of memory chips. Four chips 162, 164, 166 and 168 are shown in FIG. 5 by way of example. These memory arrays are connected to the address bus 153 and to the data bus 155 and return digital audio message values to the controller 150 in response to address values. A selector 172 selects each of the memory chips 162-168 under control of the controller 150. Jack fields 172 and 174 enable selection between 256Kbit chips and 512Kbit chips for the memory chips 162-168.

A digital to analog converter 176, such as type DAC-08N made by Signetics, or equivalent, receives each digital audio value from a port P10-P17 of the microcontroller 150 and converts the values into analog data representative of sounds comprising a selected message to be delivered. The analog audio signal is shaped and amplified by passage through a tandem string of amplifiers 178, 180, 182, 184 and 186 to a transformer 188 which has a secondary leading to a common node of the analog selector switch 158. The system controller 42 controls selection of the audio message to be delivered by virtue of serial command data values sent to the microcontroller 150 over a serial data line 190 leading from the serial data driver array 146 (FIG. 4b).

The message storage unit 44 may readily take alternative forms, such as an array of SCSI interface fixed disk drives which are connected to the system controller implemented as a personal computer, for example. The personal computer controller 42 obtains message data in digital form from the message and data platform 34 at a non-real-time transfer rate via the modem 46 and causes the message to be recorded in one of the fixed disk drives. At the same time, the system controller 42 maintains a message file directory and enables messages and segments thereof to be downloaded to the message delivery unit 44 via a communications path therebetween, such as the serial data lines. When a message is required, or when a script is set up for a particular coin telephone station or group of stations, the system controller 42 causes the designated messages and segments to be read from a selected disk drive and stored at the message delivery unit 44 in random access memory. Then, during execution of the script, the message or segment is passed through a digital to analog converter where it is converted to analog and delivered in the same manner as were the prestored messages in the solid state read only memory array 151. In this manner, messages may be changed or updated dynamically, according to predetermined criteria, such as time of day, or change in script. (An example of a control script is given hereinafter.)

Power Supply Card 48

Figure 6:
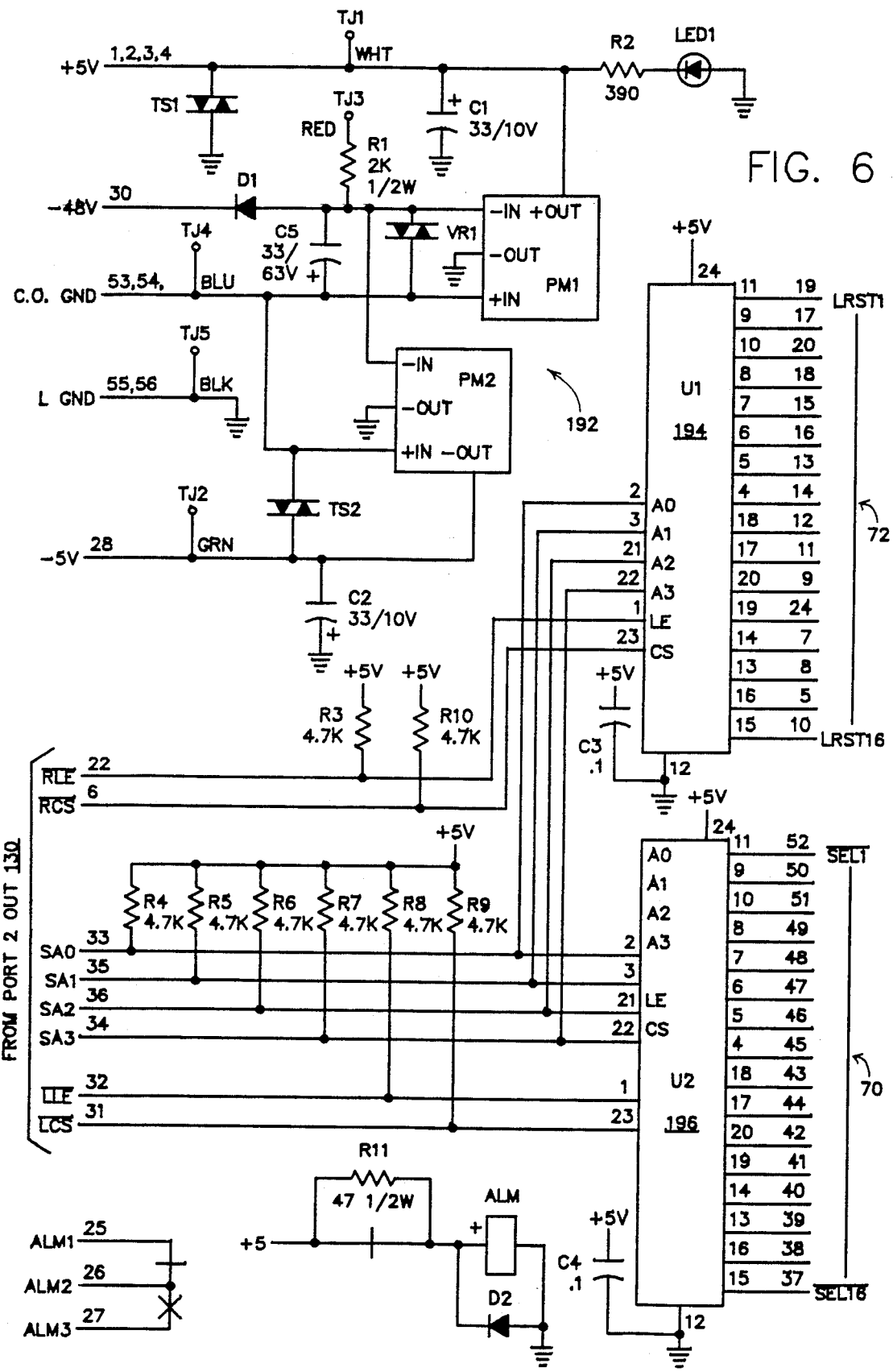

The power supply card 48, depicted in FIG. 6 includes a power converter and regulator array 192 for converting —48 volt central office battery supply into plus and minus five volt supplies for distribution throughout the system 38. A selector 194 under control of the system controller 42 by virtue of control values put out from port 2 out 130 selectively resets each of the sixteen line interface units 40 over the reset lines 72. Similarly, a selector 196 connected to the same port decodes selection values for each of the sixteen line cards 40 over the select lines 70 and thereby enables the system controller 42 to interrupt program operation of the line interface controller 52.

Backplane

FIGS. 7a, 7b, 7c and 7d together set forth a backplane wiring diagram showing electrical interconnection of the line interface units 40 with the system controller 42, message storage and delivery units 44, modem 46 and power supply 48.

Control Routines for Line Interface Unit 40

Figure 8A:
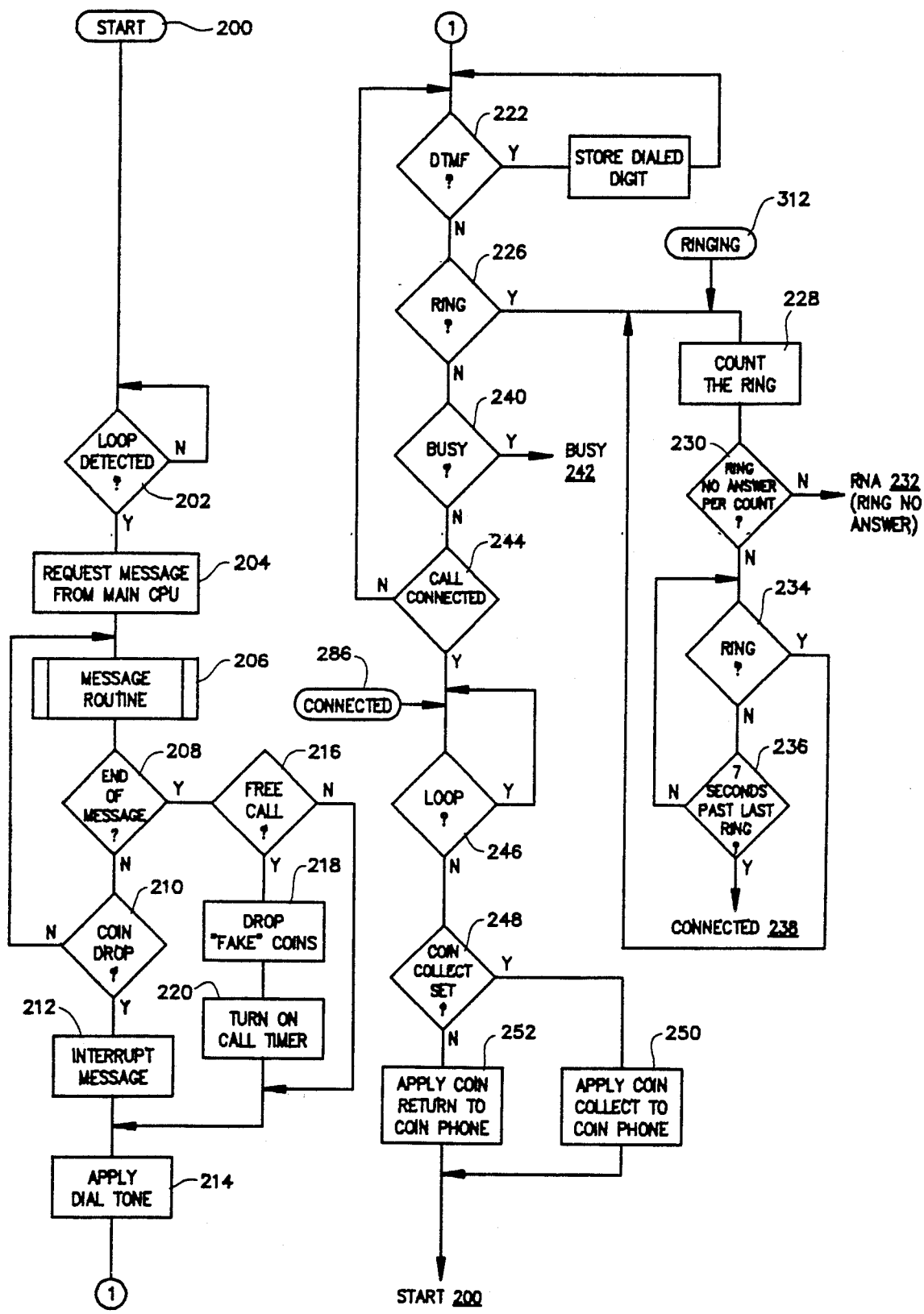

FIG. 8A depicts a main loop for a scripted control program for controlling an exemplary line interface unit 40. The scripted control program is preferably the same for each line interface unit 40, although a particular script may differ from unit to unit, or from time to time. The main loop is executed by the microcontroller 52. A start label 200 marks initial entry into the main loop and occurs after an initialization process (not shown) has been completed wherein the registers of the microcontroller 52 are initialized and are loaded with nominal or default values. A logical node 202 monitors the status of loop current at the coin telephone station 18 being supervised by this particular line interface unit 40. So long as the handset thereof remains on hook, loop current is not detected at the optoisolator 50, and the node 202 loops back to start 200. When loop current is detected, a node 204 requests that a message be delivered to the user. The interface unit controller 52 then enters a message service routine at a node 206. The message service routine, discussed hereinafter in conjunction with FIG. 8F, points to the message script presently stored in its random access memory and requests that the system controller 42 cause the message storage and delivery unit 44 to deliver specified message segments to the requesting line interface unit 40.

A logical node 208 monitors execution of the message script routine. So long as the message routine has not been completed, a logical node 201 monitors the coin telephone station 18 to see if the user has decided to deposit a coin in order to abort the scripted message routine. If a coin drop is detected, a node 212 causes the message routine to be interrupted, and a node 214 causes dial tone to be applied by connection of the user to the central office switching equipment 13.

If the message routine has reached its end, as tested by the logical node 208, a logical node 216 determines if the user is to be offered a free call (depending upon the particular script being followed). If so, a node 218 causes a coin drop signal to be generated by the DTMF generator 64 and sent to the automated coin subsystem to indicate that a "coin has been dropped" by the subsystem 38 on behalf of the present user of the coin station 18. Thereafter, a coin present signal may also be generated and sent out by the subsystem 38 to emulate the presence of a coin in the coin escrow of the coin station. If the free call is to be of a limited time duration, a timer is started at a step 220, and the program enters the apply dial tone step 214.

After dial tone is applied at the step 214, a logical node 222 monitors entry of DTMF dialing signals. Each dual tone representative of a digit of the number to be dialed is stored in a memory location at a step 224. If no dialing signal is present, a ring detect node 226 determines if a ring back signal is present on the line. If so, a ring back signal counter 228 counts the number of ring backs received. A logical node 230 monitors the number of ring back signals counted, and a logical node 234 determines if the ring back signal is present. A logical node 236 determines whether seven seconds have elapsed since the last detected ring back signal. If a predetermined number of ring back signals has been detected without answer, a ring, no answer jump 232 is made at the node 230. If seven seconds have elapsed since the last ring back signal, a connected call jump 238 is made at the node 236. The node 234 loops back to the node 228 for each new ring back signal detected.

Returning to the main loop, if a ring back signal is not detected at the node 226, the next check at a node 240 is made for a station busy signal. If a station busy signal is detected, a call is made to a busy routine 242. If not, a logical node 244 determines if the called party has answered. If not, a return is made to the node 222, and if so, a logical node 246 determines if loop current is still present. If loop current is present, a loopback is made at the node 246, and the control program waits until the call is completed. If this is a timed call, and the time set at the timer node 220 has elapsed, the node 246 loop may be interrupted by a call to the message routine 206 for generation and delivery of a message to warn the caller that a disconnect will imminently occur. Thereafter, a forced disconnect will be commanded.

When the loop 246 determines that there is no longer loop current through the coin telephone station 18, a logical node 248 determines if a coin collect flag has been set. If so, a coin collect voltage is applied to the coin telephone station by operation of the CCR and VSEL relays. If not, a coin return voltage is similarly applied to the coin telephone station by the CCR and VSEL relays. A return is then made to the Start label 200.

Figure 8B:
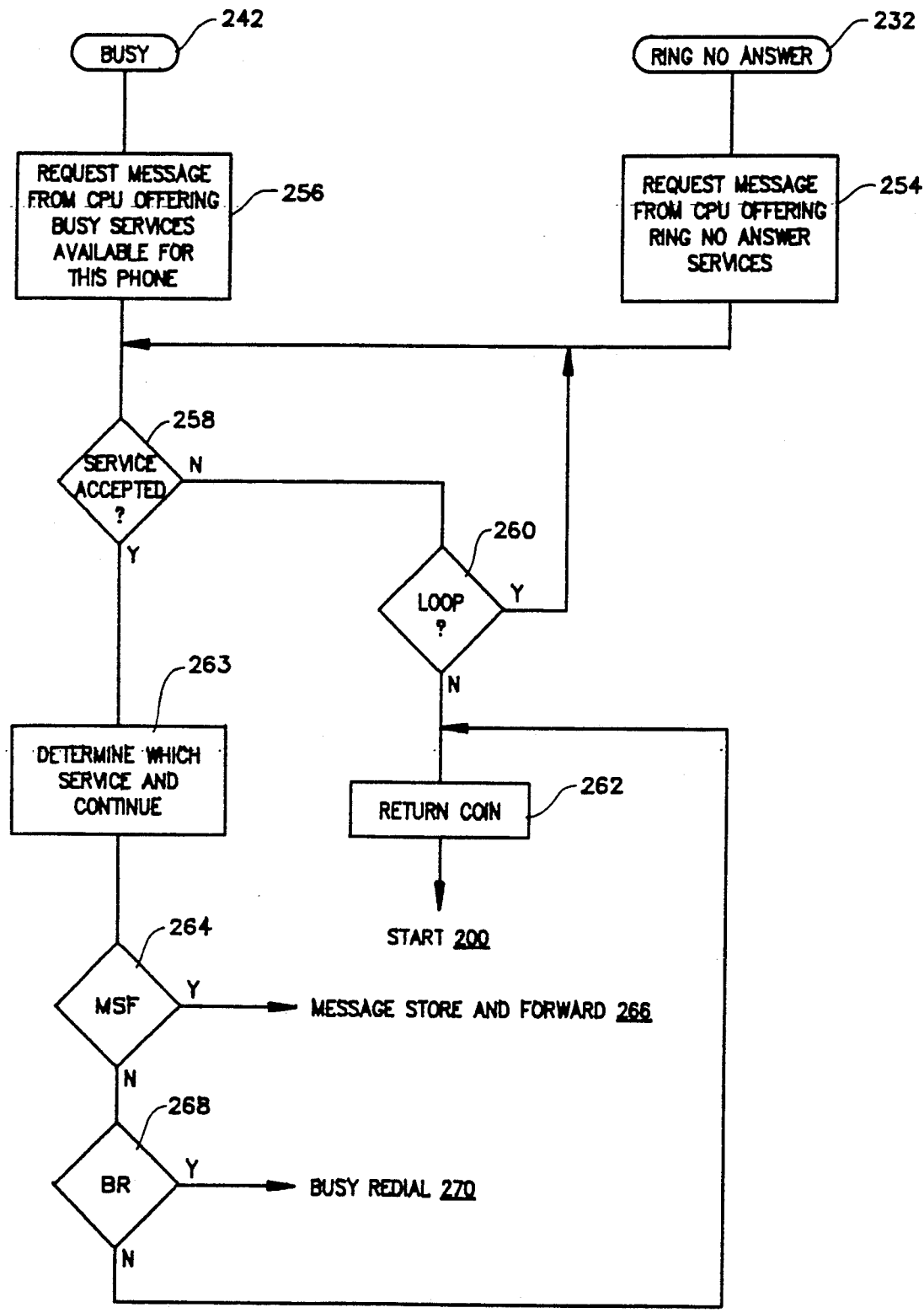

The ring, no answer jump 232 and the busy jump 242 are shown in FIG. 8B. A block 254 requests that the line interface unit microcontroller 52 request an appropriate ring, no answer message be delivered to the coin phone user. The microcontroller 52 signals the system controller 42, and a script for ring, no answer is then downloaded or called by the microcomputer 52. At the same time, a repertoire of messages are called and delivered by a selected message storage unit 44 to the coin telephone station user. These messages prompt the user to take predetermined action by entry of data at the keypad 24.

Similarly, a node 256 causes a similar script and message repertoire respectively to be called and delivered which are appropriate to detection of a station busy calling condition. A logical node 258 determines if one of the offered special services has been accepted. If not, a check is made at a logical node 260 to see if loop current is still present. If loop current is present, a loopback to the node 258 is made. If loop current is not present, as tested at the node 260, a return coin node 262 forces a disconnect from the central office and causes coin return voltage to be supplied to the coin telephone station 18 to return the coin(s) in the escrow chamber to the user, and a return is made to the start label 200.

If the node 258 determines that one of the special services has been selected by the user, a generalized functional block 263 determines which special service is selected. Two exemplary special services are described herein: a message store and forward service; and a busy signal/redial service. Other services are easily added at this location in the main loop. A logical node 264 tests if the message store and forward service has been selected. If so, a call is made to a message store and forward routine 266. If not, a node 268 determines if a busy/redial service is selected. If so, a call is made to a busy/redial routine 270; and if not, the program proceeds to the block 262 which effectively terminates the call.

The message store and forward routine is graphed in FIG. 8C. Therein, the label 266 leads to a block 272 which causes the coin telephone station 18 to be separated from the central office by operation of the CL relay. Operation of the L1 relay then allows the line interface unit 40 to dial up the message platform 34 over the coin trunk 19' or over the dedicated pair T2/R2, depending upon the configuration of the line interface unit 40 as previously discussed. A logical node 274 determines if a loop connection is established with the message platform 34. If a connection is present, a node 276 sets the coin collect flag, and a node 278 causes the connection of the coin telephone station 18 to be reestablished with the central office (or directly with the platform) by release of the CL relay. A logical node 280 then monitors the progress of the call to the message platform 34 in a loop. In this call, the message platform 34 typically generates audio prompts enabling the coin station user to record a message for delivery to the called party. After the call to the message platform 34 has ended, a node 284 causes the telephone number dialed by the coin telephone station user and other information as required to be sent to the message ( 25 platform 34. The message platform 34 then subsequently attempts delivery of the user's recorded message to the called party whose telephone number was originally entered and recorded at the node 224.

If a connection is not yet made to the message platform 34, as tested at the node 274, a call is made to a test loop subroutine 288. This subroutine is very simple and is graphed in FIG. 8D. A logical node 296 determines if loop current is present at the coin telephone station 18, meaning that the user has not abandoned the call. If so, a return is made, and if not, a return is made to the start label 200. If the user had deposited any coins, a coin return voltage would be sent to the coin telephone station 18 at this point in the program in order to return all coins in the escrow chamber to the user.

A logical node 290 tests whether a time set by a time-out counter has elapsed. This test limits the duration for connecting to the message platform 34. If time remains, a loop back is made to the node 274. If time has expired with no connection, a block 292 clears a coin collect flag 292 resulting in coin return voltage being supplied to the coin telephone station 18. A node 294 requests a service failure message from the system controller 42, and an appropriate service failure message is thereupon generated and delivered by a selected message unit 44 to the user. A return is made to the connected label 286 of the main loop diagrammed in FIG. 8a.

The busy/redial routine is graphed in FIG. 8E. The busy/redial label 270 leads to a block 298 which causes the coin telephone station 18 to be separated from the coin trunk 19. A block 300 then requests a suitable message for this feature from the system controller 42. The message may be a commercial message resulting in more calling credit to the user, or it may be a survey seeking the user's voluntary participation. A logical node 302 tests for loop current at the coin station 18, and if the user has returned the handset to on-hook, a return is made to the start label 200. If the user remains off-hook, a logical node 304 detects if the message being delivered is nearly completed. If not, a loop back is made to the node 302. If so, a node 306 causes the called party to be automatically redialled while the coin station user hears the remainder of the message. If the line is still busy, as tested at a node 308, a loop back is made to the node 300. However, if the line is not busy, and a ring back condition is detected, a block 310 causes the coin collect flag to be set, and a return is made to the ringing label 312 of the main loop.

Figure 8F:
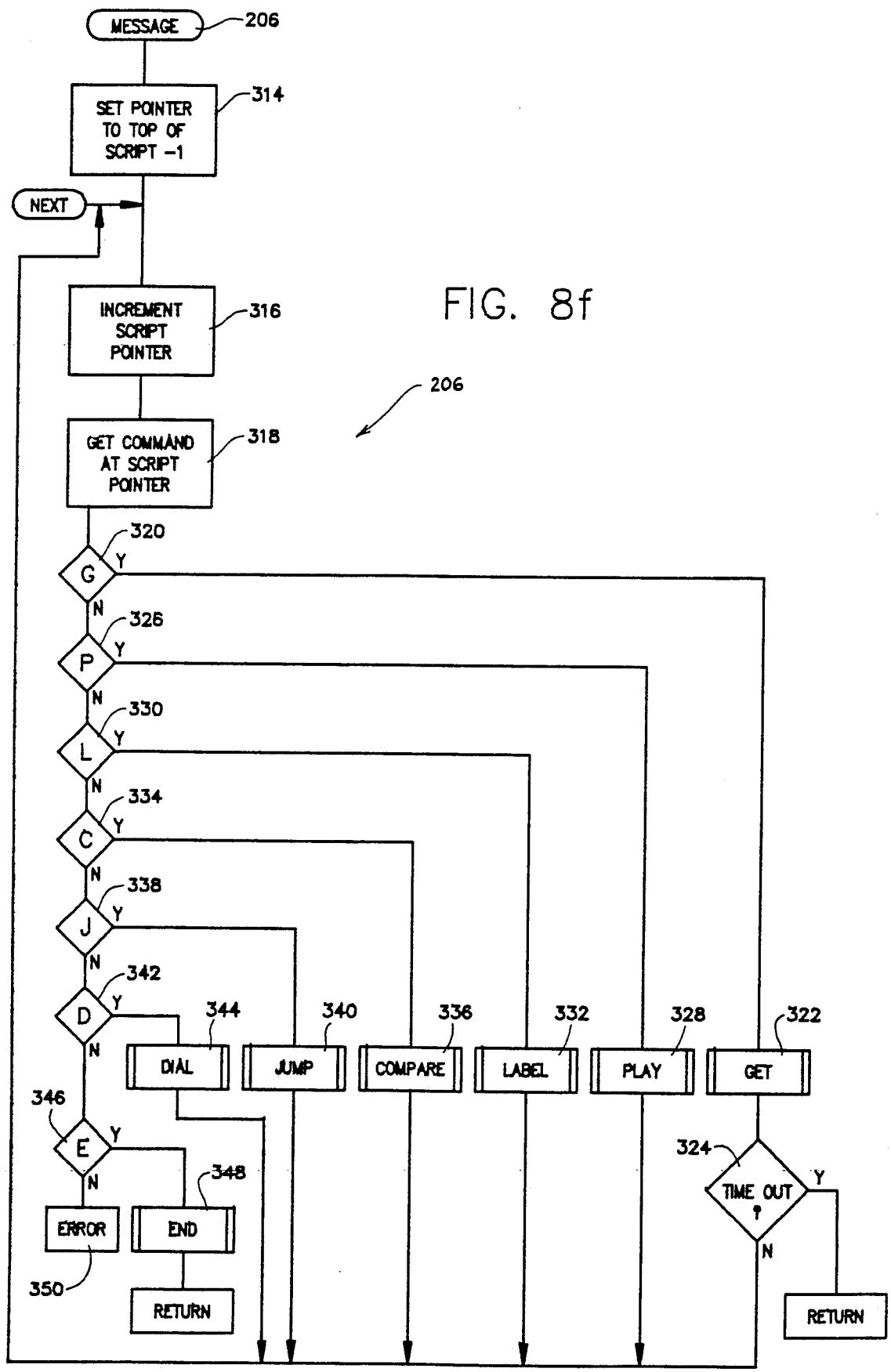

The scripted message service routine is graphed on FIG. 8F. The message label 206 leads to a block 314 which causes a message pointer to be set to the top of the script, minus one. A block 316 then causes the script pointer to increment by one. A block 318 obtains a command at the script pointer, the command depending upon the particular script being followed. As presently implemented, a script may employ up to seven separate operators. The message routine detects each operator and calls an appropriate service subroutine.

A logical node 320 determines if a get subroutine 322 is called by the script. If so, a timer 324 determines if a timeout has occurred. If so, a return is made, if not, a return is made to the block 316, and the next operator is sought. A logical node 326 determines if a play operator is specified, and if so, a play subroutine 328 is called. A logical node 330 determines if a label operator is specified, and if so, a label subroutine 332 is called. A logical node 334 determines if a compare operator is specified by the script, and, if so, a compare subroutine 336 is called. A logical node 338 determines if a jump operator is specified; if so, a jump subroutine 340 is called. A logical node 342 determines if a dial operator is specified; if so, a dial subroutine 344 is called. A logical node 346 determines if an end operator is called; if so, an end subroutine 348 is called, and a return is made to the main loop. If no operators are detected in the message routine 206, an error block 350 is entered, and an error condition is signalled to the system controller 42 which may thereupon supply a different message script and reset/-restart the line card 40, as appropriate.

The get subroutine 322 is graphed in FIG. 8G, and it functions to obtain keypad data from the coin station user. In FIG. 8G the get label 322 leads to a logical node 352 which tests whether a DTMF tone has been received from the coin telephone station keypad 24. If not, a time-out timer is checked at a logical node 354; and if a preestablished time period has elapsed, a time out flag is set at a block 356, and a return is made to the message routine 206. If the time has not expired, a loop back to the node 352 is made. If a DTMF signal has been received as tested by the node 352, a block 358 causes the digit to be stored, and a block 360 increments the script pointer. A return is then made to the message routine 206.

The play subroutine 328 is graphed in FIG. 8H, and it causes a message to be generated and delivered to the user. The play label 328 leads to a block 362 which causes the coin telephone station to be connected to the message line 74 so that the message can be sent to the coin station 18 via the transformer T1 and T1/R1 leading to the station 18. A block 364 thereupon increments the script pointer by one, and a block 366 obtains a message number from the script. A block 368 then causes the script pointer to increment by one, and a block 370 causes the message delivery unit 44 to start delivery of the message to the user. A loop formed at a logical node 372 monitors message delivery until the message has been completed. When the message has been completely delivered, a return is made to the message routine 206.

The label subroutine 332, graphed in FIG. 8I, causes program execution to move to a label as stated in the script. A label in a script is used to identify a desired message segment, and when the label is located, its suffix indicates to the system controller the particular message segment then needed for playout to the user without user interaction. The label 332 leads to a block 372 which causes the script pointer to be incremented by two. A return is then made to the message routine 206.

The compare subroutine 336, graphed in FIG. 8J, causes user responses to be compared. The compare response label 336 leads to a block 374 which causes the script pointer to be incremented and which obtains the compare argument from the script. A block 376 thereupon increments the script pointer and obtains a target label from the script. A logical node 378 then determines if the digit entered by the user satisfies the compare argument. If not, the script pointer is incremented at a block 380 and a return is made to the message routine 206. If so, a search is made of the script for the label resulting from the satisfactory comparison at a block 382. A logical node 384 determines if the presently considered label is the specified one. If not, a loop back is made to the search block 382 and the search continues. When the specified label is found at the node 384, a block 386 causes the script pointer to be decremented to one less than the label, and causes a return to the message delivery routine 206.

Figure 8K:
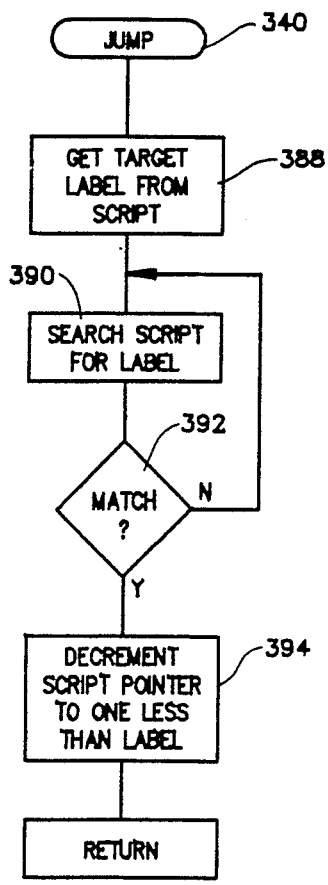

The jump subroutine 340 is graphed in FIG. 8K. Therein, the jump label 340 leads to a block 388 which obtains the target label from the script. A block 390 then searches the script for the target label as specified at the block 388. When a match occurs, as determined by a logical node 392, the script pointer is decremented by one less than the label address in the script, and a return is made to the message routine 206. The logical node 392 loops back to the search step 390 until a match is found.

Figure 8L:
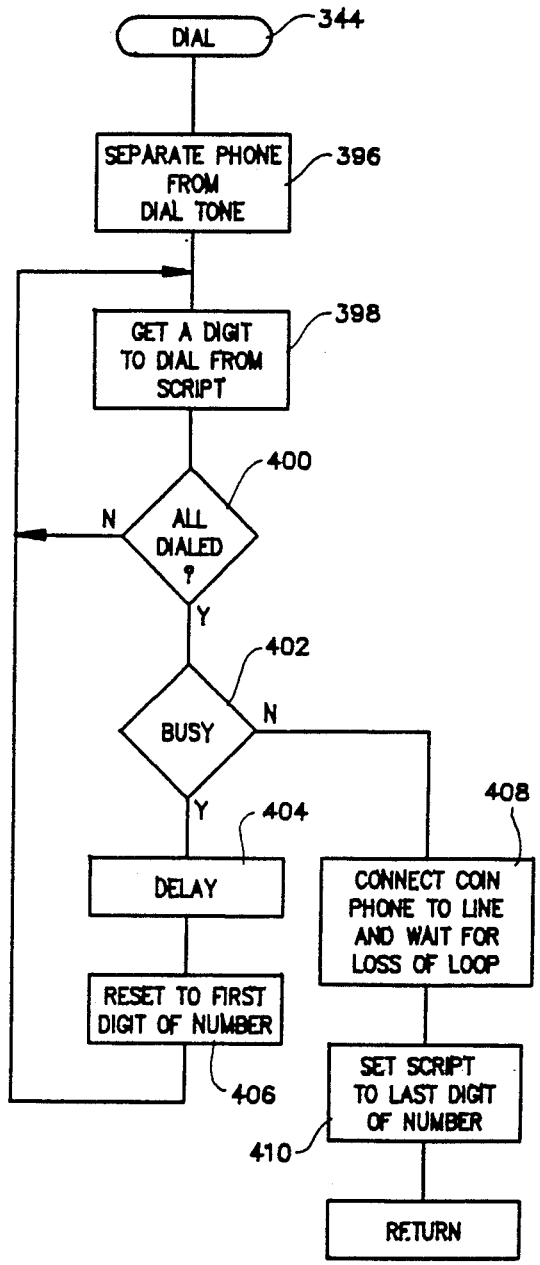

The dial subroutine 344 is graphed in FIG. 8L. Therein, the dial label leads to a block 396 which causes the coin telephone station 18 to be separated from the central office trunk 19 via actuation of the CL relay. A block 398 then obtains a digit to be dialed from the script and causes L1 relay to obtain dial tone on the central office trunk 19 and the DTMF generator 64 to generate and put out the DTMF tones corresponding to the digit via the second line transformer T2. A logical node 400 determines if all of the digits required by the script have been dialed, and loops back to the block 398 until all of the digits have been obtained and dialed. Then, a logical node 402 monitors the central office trunk line 19 for a station busy signal. If one is detected at the node 402, a predetermined delay period is called at a block 404, and after the delay period has elapsed a reset of the script pointer to the first digit of the number to be dialed is made at a block 406, with a return to the block 398 following. If a station busy signal is not detected at the node 402, and there is no ring back for seven seconds, thereby indicating that the called party has answered, the CL relay is released, thereby connecting the coin telephone station to the called party station at a block 408, and the script pointer is set to the last digit of the number called at a block 410. A return is then made to the message routine 206. The end routine 348 simply causes a return from the message routine 206 to the main loop, thereby indicating that the message script has been completed.

Message Script

A message script contains a list of commands and arguments which are understood by the line interface unit 40. The line interface unit 40 executes the script by decoding each command and calling up preprogrammed subroutines. Here follows a list of exemplary commands for line interface unit execution:

Px Play a message segment, where x is the segment number to be played.

G Get a DTMF response from the coin telephone station keypad 24. The next tone received is returned or if no tone is received before timeout, the routine returns with a flag set.

Ex End of script, where x is 1 or 0: 1 to provide a free call and 0 to provide a regular coin-drop prepay call.

Lx Label number, where x is the LABEL number.

Cxy Compare present digit to last digit captured by the GET command and jump to a LABEL, where x is the digit to compare with the last digit obtained by the GET routine, and y is the LABEL to jump to.

Jx Jump to a LABEL number, where x is the LABEL to jump to.

D Dial command. The dial command character is followed by a telephone number to be automatically dialed by the line interface unit 40.

In its simplest form, a script may be written to play a message and reward the coin station user with a coin-free call. Consider the single message "Buy BRAND X jeans and save". Assume that this message has been assigned segment number 1. The following script: P1 E1 which causes the line interface unit 40 to play this message (PI) to the user just after loop current is detected, for example, and then end the message routine with an argument (E1) providing a coin-free call.

The following example provides a more complicated interactive script which is designed to enable a coin station user to arrange ground transportation at an airport and be rewarded with a coin-free local call. Assume that five service provider companies have combined to offer the service:

```
AAA Rent-a-Car at 555-1111
ZZZ Rent-a-Car at 555-2222
ABC Cab at 555-3333
XYZ Cab at 555-4444
DEF Cab at 555-5555
```

The message segments are as follows:

1 "You can arrange your ground transportation and receive a free local call. Press ONE to accept this offer or ZERO to reject this offer."

2 "Do you wish to rent a car or use a taxi? Press ONE for a cab, or press TWO for a rental car."

3 "Press ONE for ABC Cab, Press TWO for XYZ Cab, or Press THREE for DEF Cab."

4 "Press ONE for AAA Rent-a-Car, or Press TWO for ZZZ Rent-a-Car."

5 "Thank You!"

Here is a script implementing interactive message delivery in accordance with the principles of the present invention. (Spaces have been added between commands to provide for clarity Labels have been underlined for further clarity).

```
P1 G C01 C12 L1 P5 E0 L2 P2 G C13 C27 E0 L3 P3 G C14 C25 C36
E0 L4 D5553333 E1 L5 D5554444 E1 L6 D5553333 E1 L7 P4 G C18
C29 E0 L8 D5551111 E1 L9 D5552222 E1
```

When this script is started, the first command is P1 which causes message segment #1 to be played. The G command waits for a time out or a DTMF tone to be entered at the station keypad 24. Assume that the user entered a ONE value to accept the service. The instruction C01 then compares the DTMF tone captured by the Get command with zero, and failing to match ignores the jump to LABEL 1. Next, the instruction C12 causes the value ONE to be compared with the DTMF tone from the last Get command which does result in a match. The script pointer is then set to LABEL 2 or L2, and execution continues at the P2 instruction. Message segment #2 is played to the user, and a Get command G is executed until the user makes a choice. Assume that the user's response is a TWO, i.e. the user wishes to rent a car. The next script compare (C13) fails, so the compare (C27) is executed which results in a match and causes a search for the LABEL 7 (L7) in the script. Once L7 is found, the message segment specified therein (P4) is played which offers the user another choice inviting a response from the user. The user's response will be obtained by the Get (G) command. If a ONE is entered by the user, execution is continued at LABEL 8 (L8), which is a dial command causing the line unit 40 to generate and put out to the central office via the trunk 19 a DTMF sequence corresponding to 555-2222. This step is followed by an exit with a coin-free call (E1). In the event that the user enters a THREE at the keypad 24, or some other invalid number not called for by the selected message, an E0 command causes an exit without the grant of a coin-free call, since both compares fail, leaving E0 as the next and final command of the script to be executed. A return is then made to the main loop to the node 208, as previously explained.

Other scripts are easily written for a virtually unlimited variety of messages and user responses. For example, the Get command may be used to obtain not only numerical but also alphabetic information responses from the coin telephone station user, as when the pound and star special function keys are employed, or where multiple keystrokes are used to indicate an "a", or "b", etc. From the foregoing discussion and examples of scripts, those skilled in the art will immediately recognize that the coin message management system 38 of the present invention provides virtually unlimited flexibility in offering a wide variety of on-line reprogrammable, interactive services and functions at conventional coin telephone stations 18 thereby vastly expanding their utility and capability without requiring any physical modification whatsoever of the coin telephone stations themselves.

Having thus described a presently preferred embodiment of the present invention, it will now be appreciated that the objects of the invention have been fully achieved, and it will be understood by those skilled in the art that many changes in construction and widely varying embodiments and applications of the invention will suggest themselves without departing from the spirit and scope of the invention. The disclosures and the descriptions herein are purely illustrative and are not intended to be in any sense limiting.

We claim:

1. A coin telephone message and management system for use at a central office location of a telephone system with a plurality of conventional remotely located coin telephone stations and an associated automated coin subsystem to which the coin telephone stations are connected by coin trunks, the coin telephone message and management system comprising:

a plurality of programmable line interface unit means each being connected to a said coin trunk for monitoring electrical signals present on the coin trunk indicative of usage of the station connected thereto, for delivering messages to a user of the station, and for generating electrical signals emulative of operation of the station for thereby controlling the automated coin subsystem, message storage and delivery means selectively connectable to a said programmable line interface unit means for delivering at least one selectable audio message to the user of a said station via the coin trunk, and system controller means for coordinating operations of the programmable line interface unit means and the message storage and delivery means.

2. The coin telephone message and management system set forth in claim 1 wherein the message storage and delivery means comprises digital storage means for storing said messages in digital format in a digital storage medium and further includes controller means for causing said messages to be read from said digital storage medium and digital to analog conversion means for causing said digital format messages to be converted to analog electrical signals for delivery to said user via said line interface unit means.

3. The coin telephone message and management system set forth in claim 1 further comprising modem means for providing a data connection of the system controller means to the telephone system.

4. The coin telephone message and management system set forth in claim 3 wherein data is accumulated within the system and wherein the data connection provided by the modem means enables a message and data storage platform to collect the data.

5. The coin telephone message and management system set forth in claim 1 wherein the telephone system further comprises a message and data platform, and wherein a said line interface unit means is programmed to generate dial signals for calling the message and data platform and is further programmed for enabling connection of a said coin telephone station with the said message and data platform.

6. The coin telephone message and management system set forth in claim 5 wherein each of the plurality of line interface unit means includes trunk line monitor means for monitoring calling sequence signaling conditions present on the coin trunk with which the line interface unit means is connected.

7. The coin telephone message and management system set forth in claim 6 wherein the trunk line monitor means includes means for detecting DTMF dial up sequences, dial tone, ring back, and called party busy signaling conditions.

8. The coin telephone message and management system set forth in claim 6 wherein each of the plurality of line interface unit means includes means for detecting coin deposit tone signaling conditions.

9. The coin telephone message and management system set forth in claim 6 wherein each of the plurality of line interface unit means includes means for generating and putting out coin deposit tone signaling conditions to control the automated coin subsystem.

10. A coin telephone message and management system for connecting service pairs of a central office switching means to a plurality of conventional coin telephone stations via tip and ring wire pairs, the coin telephone message and management system comprising:

plural line interface unit means, there being a separate line interface unit means for each said conventional coin telephone station and in electrical connection with the tip and ring wire pair thereof, each said line interface unit means including:

loop detection means for detecting occurrence of loop current on said tip and ring wire pair, signalling tone detection means for detecting signalling tones present on the service pair and tip and ring wire pair, signalling tone generation means for generating and putting out signalling tones selectively to the service pair and tip and ring wire pair, audio message delivery means for connecting the tip and ring wire pair to a message segment storage and delivery means for delivery of selected message segments to the coin telephone station, line separation switch means for controlling connection of the coin telephone tip and ring wire pair to the service pair, program storage means for receiving and storing a scripted control program for controlling operations of the line interface unit means, and controller means connected to the loop detection means, signalling tone detection means, signalling tone generation means, audio message delivery means, and the line separation switch means, and program storage means for controlling operation of the line interface unit means in accordance with the scripted control program;

message segment storage and delivery means for storing prerecorded message segments and for delivering each selected prerecorded message segments to a said line interface unit means at the request thereof, system supervisor means in connection with the plural line interface unit means and with the message segment storage and delivery means for supervising operation of the coin telephone message and management system and including communications means for providing each said line interface unit means with a scripted control program and for collecting data from the line interface unit means relating to coin telephone station use activities at each said line interface unit means, and storage means for storing the collected data relating to use activities.

11. The coin telephone message and management system set forth in claim 10 wherein each said line interface unit means includes coin control means for selectively applying coin collect and coin return voltages to the coin telephone station associated therewith in accordance with a said scripted control program being executed by the controller means of the said line interface unit means.

12. The coin telephone message and management system set forth in claim 10 wherein the signaling tone detection means includes means for detecting DTMF and coin activity tones generated at the coin telephone station associated therewith.

13. The coin telephone message and management system set forth in claim 10 wherein the signaling tone detection means includes means for detecting DTMF dial up sequences, dial tone, ring back, and called party busy signalling conditions.

14. The coin telephone message and management system set forth in claim 10 wherein the service pairs of the central office are coin trunks extending to conventional coin service controller equipment, and wherein each said signaling tone generation means of each line interface unit means comprises means for generating coin deposit tone signals in order to provide coin credit for a user of the coin telephone station associated therewith at the conventional coin service controller equipment in accordance with the scripted control program being executed by the controller means of the said line interface unit means.

15. The coin telephone message and management system set forth in claim 14 wherein each said line interface unit means includes means for generating a coin deposit current and for supplying the coin deposit current over the coin trunk associated therewith.

16. The coin telephone message and management system set forth in claim 10 wherein the system supervisor means comprises modem means connected to a service pair of the central office switching means for enabling remote downloading of a said scripted control program for a said line interface unit, and for enabling remote downloading of message segments to the message segment storage and delivery means.

17. The coin telephone message and management system set forth in claim 10 wherein the central office switching means provides dial access to and from a message and data platform means, and wherein a said line interface unit means scripted control program causes a call to be placed by the said line interface unit means over the service pair to the message and data platform and is further programmed to control the line separation switch means for separating the coin telephone station from the service pair during the calling interval to the said message and data platform.

18. The coin telephone message and management system set forth in claim 10 wherein the message segment storage and delivery means comprises digital storage means for storing said message segments in digital format in a digital storage medium and further includes controller means for causing said message segments to be read from said digital storage medium and digital to analog conversion means for converting said read message segments to analog electrical signals for delivery to a said coin telephone station via its said line interface unit means.

* * * * *